US012590220B2

(12) United States Patent
Obata et al.

(10) Patent No.: US 12,590,220 B2
(45) Date of Patent: Mar. 31, 2026

(54) THERMOSETTING COMPOSITION, METHOD FOR MANUFACTURING MOLDED ARTICLE USING THE SAME, AND CURED PRODUCT

(71) Applicant: IDEMITSU KOSAN CO., LTD., Chiyoda-ku (JP)

(72) Inventors: Yutaka Obata, Ichihara (JP); Katsuki Ito, Ichihara (JP); Haruhiko Mori, Ichihara (JP)

(73) Assignee: IDEMITSU KOSAN CO. , LTD., Chiyoda-ku (JP)

(*) Notice: Subject to any disclaimer, the term of this patent is extended or adjusted under 35 U.S.C. 154(b) by 726 days.

(21) Appl. No.: 15/734,403

(22) PCT Filed: Jun. 4, 2019

(86) PCT No.: PCT/JP2019/022135
§ 371 (c)(1),
(2) Date: Dec. 2, 2020

(87) PCT Pub. No.: WO2019/235465
PCT Pub. Date: Dec. 12, 2019

(65) Prior Publication Data
US 2021/0171683 A1 Jun. 10, 2021

(30) Foreign Application Priority Data
Jun. 5, 2018 (JP) ................................ 2018-108103

(51) Int. Cl.

| | |
|---|---|
| ***C09D 133/14*** | (2006.01) |
| ***C08F 220/14*** | (2006.01) |
| ***C08F 290/06*** | (2006.01) |
| ***C08K 3/36*** | (2006.01) |
| ***C08K 5/541*** | (2006.01) |
| ***C08K 7/18*** | (2006.01) |
| ***C08K 9/06*** | (2006.01) |
| *C08F 220/18* | (2006.01) |

(52) U.S. Cl.
CPC .......... *C09D 133/14* (2013.01); *C08F 220/14* (2013.01); *C08F 290/062* (2013.01); *C08K 3/36* (2013.01); *C08K 5/541* (2013.01); *C08K 7/18* (2013.01); *C08K 9/06* (2013.01); *C08F 220/1812* (2020.02); *C08K 2201/011* (2013.01)

(58) Field of Classification Search
CPC .. C09D 133/14; C08F 220/14; C08F 290/062; C08F 220/1812; C08K 3/36; C08K 5/541; C08K 7/18; C08K 9/06; C08K 2201/011
USPC ........................................................ 524/413
See application file for complete search history.

(56) References Cited

U.S. PATENT DOCUMENTS

| | | | |
|---|---|---|---|
| 2013/0237660 | A1 | 9/2013 | Iwasaki et al. |
| 2015/0322233 | A1 | 11/2015 | Iwasaki et al. |
| 2017/0203476 | A1 | 7/2017 | Obata et al. |
| 2020/0247019 | A1 | 8/2020 | Obata et al. |

FOREIGN PATENT DOCUMENTS

| | | | | | |
|---|---|---|---|---|---|
| CN | 104136471 | A | | 11/2014 | |
| CN | 106459550 | A | | 2/2017 | |
| CN | 106459550 | B | * | 3/2019 | ........... B29C 39/003 |
| JP | 11335597 | A | * | 12/1999 | |
| JP | 2003155318 | A | * | 5/2003 | |
| JP | 2016-8230 | A | | 1/2016 | |
| JP | 2016008230 | A | * | 1/2016 | ........... B29C 39/003 |
| TW | 201615727 | A | | 5/2016 | |
| WO | WO 2012/056972 | A1 | | 5/2012 | |

OTHER PUBLICATIONS

Combined Chinese Office Action and Search Report issued Mar. 2, 2022 in Chinese Patent Application No. 201980037374.1, 9 pages.
Taiwanese Office Action issued Jan. 5, 2023 in Taiwanese Patent Application No. 108119490, 6 pages.
International Search Report and Written Opinion issued on Aug. 13, 2019 in PCT/JP2019/022135 filed on Jun. 4, 2019, 6 pages.

* cited by examiner

*Primary Examiner* — Kelechi C Egwim
(74) *Attorney, Agent, or Firm* — Oblon, McClelland, Maier & Neustadt, L.L.P.

(57) ABSTRACT

A thermosetting composition comprising the following components (A-1), (A-2), (B), and (C), and having the viscosity of 5 to 200 Pa·s at a shear rate of 10 $s^{-1}$ at 25° C., and having the viscosity of 1 to 50 Pa·s at a shear rate of 100 $s^{-1}$ at 25° C., as measured by JIS K7117-2: (A-1) an acrylate compound or a methacrylate compound in which a substituted or unsubstituted alicyclic hydrocarbon group including 6 or more ring carbon atoms is ester-bonded, (A-2) a compound represented by the following formula (I-1), (B) a spherical silica, (C) a white pigment.

(I-1)

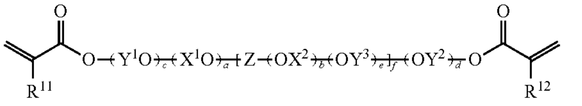

19 Claims, 3 Drawing Sheets

THERMOSETTING COMPOSITION, METHOD FOR MANUFACTURING MOLDED ARTICLE USING THE SAME, AND CURED PRODUCT

TECHNICAL FIELD

The invention relates to a thermosetting composition, a method for manufacturing a molded article using the same, and a cured product.

BACKGROUND ART

Emitting devices using optical semiconductors such as a light-emitting diode (LED), which have become popular in recent years, is usually manufactured by fixing an optical semiconductor (LED) on a lead frame of a molded body formed by integrally molding a synthetic resin as a reflecting material (reflector) with a lead frame in a concave shape and, sealing the lead frame with a sealing material such as an epoxy resin or a silicone resin.

As a material for a reflecting material, Patent Document 1 discloses that a composition which is obtained by blending a white pigment such as titanium oxide with a thermosetting resin such as an acrylate resin and the composition gives a cured product having excellent heat resistance and weather resistance and excellent adhesion to peripheral members.

RELATED ART DOCUMENTS

Patent Documents

[Patent Document 1] WO2012/056972

SUMMARY OF THE INVENTION

It is an object of the invention to provide a thermosetting composition capable of obtaining a cured product with suppressed burrs and excellent heat resistance, wherein the thermosetting composition has excellent filling property, a method for manufacturing a molded article using the same, and a cured product.

As a result of intensive studies to solve the above problems, the inventors have found the following thermosetting compositions, thereby completing the invention.

According to the invention, the following thermosetting composition and the like are provided.

1. A thermosetting composition comprising the following components (A–1), (A-2), (B), and (C), and having the viscosity of 5 to 200 Pa·s at a shear rate of 10 $s^{-1}$ at 25° C., and having the viscosity of 1 to 50 Pa·s at a shear rate of 100 $s^{-1}$ at 25° C., as measured by JIS K7117-2:

(A-1) an acrylate compound or a methacrylate compound in which a substituted or unsubstituted alicyclic hydrocarbon group including 6 or more ring carbon atoms is ester-bonded, (A-2) a compound represented by the following formula (I-1), (B) a spherical silica, (C) a white pigment, wherein in the formula (1-1), $Y^1$, $Y^2$ and $Y^3$ independently represent a hydroxy substituted alkylene group including 1 to 10 carbon atoms or an alkylene group including 1 to 10 carbon atoms;

$X^1$ and $X^2$ independently represent an alkylene group including 1 to 10 carbon atoms, or a hydroxy substituted alkylene group including 1 to 10 carbon atoms;

Z represents or $—Z^1—Z^2—Z^3—$, or $—Z^4—Z^5—Z^6$;

$R^{11}$ and $R^{12}$ independently represent a hydrogen atom or a methyl group;

$Z^1$ and $Z^3$ independently represent a substituted or unsubstituted divalent aromatic hydrocarbon group including 6 to 12 ring carbon atoms, or a substituted or unsubstituted divalent alicyclic hydrocarbon group including 6 to 12 ring carbon atoms;

$Z^2$ represents $—C(CH_3)_2—$, $—C(CF_3)_2—$, $—CH_2—$, $—S(=O)_2—$, $—O—$ or $—C(=O)—$;

$Z^4$ and $Z^6$ independently represent a divalent organic group;

$Z^5$ represents a substituted or unsubstituted divalent fluorenyl group, or a substituted or unsubstituted divalent naphthyl group;

a and b independently represent an integer of 0 to 10; c, d and e independently represent 0 or 1; f represents an integer of 1 to 5;

$a+(b\times f)+c+d+(e\times f)$ is 2 or more.

2. The thermosetting composition according to 1, wherein the amount of the component (B) is 10 to 90% by mass and the amount of the component (C) is 1 to 50% by mass, based on 100% by mass of the total of the components (A-1), (A-2), (B), and (C).

3. The thermosetting composition according to 1 or 2, wherein the substituted or unsubstituted alicyclic hydrocarbon group including 6 or more ring carbon atoms of the component (A-1) is one or more groups selected from the group consisting of a substituted or unsubstituted adamantyl group, a substituted or unsubstituted norbornyl group, a substituted or unsubstituted isobornyl group, and a substituted or unsubstituted dicyclopentanyl group.

4. The thermosetting composition according to any one of 1 to 3, further comprising one or more components selected from the group consisting of the following components (D) to (F), wherein the amount of the component (B) is 10 to 90% by mass and the amount of the component (C) is 1 to 50% by mass, based on 100% by mass of the total of the components (A-1), (A-2), and (B) to (F):

(D) an acrylic acid, a methacrylic acid, or a monofunctional acrylate compound or methacrylate compound having a polar group;

(E) a monofunctional acrylate compound or methacrylate compound other than the components (A-1) and (D);

(F) a multifunctional acrylate compound or methacrylate compound other than the component (A-2).

5. The thermosetting composition according to 4, wherein the components (E) and (F) do not contain an aliphatic urethane structure.

(I-1)

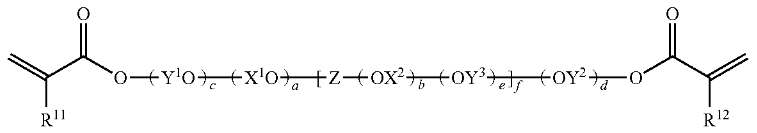

6. The thermosetting composition according to any one of 1 to 5, wherein the component (B) is a spherical silica which is surface-treated with an acrylic silane or surface-treated with a methacrylic silane.
7. The thermosetting composition according to any one of 1 to 6, wherein a mean particle size (D50) of the component (B) is 0.1 to 100 μm.
8. The thermosetting composition according to any one of 1 to 7, further comprising one or more components selected from the group consisting of (G) a plate-like filler and (H) a nanoparticle.
9. A method for manufacturing a molded article, comprising the steps of:
  supplying the thermosetting composition according to any one of 1 to 8 into a plunger;
  filling the supplied thermosetting composition into a molding part of a mold by the plunger;
  thermosetting the filled thermosetting composition in the molding part; and
  extruding the thermosetting resin, which is thermosetted.
10. The method for manufacturing a molded article according to 8, wherein the temperature of the mold part constituting the molding part is 100 to 180° C.
11. The method for manufacturing a molded article according to 9 or 10, wherein a flow path controlled by a temperature of 50° C. or less is provided between the plunger and the molding part, and the filling is performed through the flow path.
12. The method for manufacturing a molded article according to 11, wherein the flow path has a gate system for blocking the flow of the thermosetting composition and the transfer of heat.
13. The method for manufacturing a molded article according to 12, wherein the filling is performed by opening a gate of the gate system;
  in the thermosetting, pressure retention is performed; and after the pressure retention, the gate of the gate system is closed to complete thermosetting.
14. The method for manufacturing a molded article according to any one of 9 to 13, wherein the step of filling and the step of thermosetting are performed in 0.2 to 3 minutes.
15. A cured product, which is manufactured using the thermosetting composition according to any one of 1 to 8.
16. The cured product according to 15, which is a molded article.

According to the invention, a thermosetting composition capable of obtaining a cured product with suppressed burrs and excellent heat resistance, wherein the thermosetting composition has excellent filling property, a method for manufacturing a molded article using the same, and a cured product can be provided.

MODE FOR CARRYING OUT THE INVENTION

Figure 1:
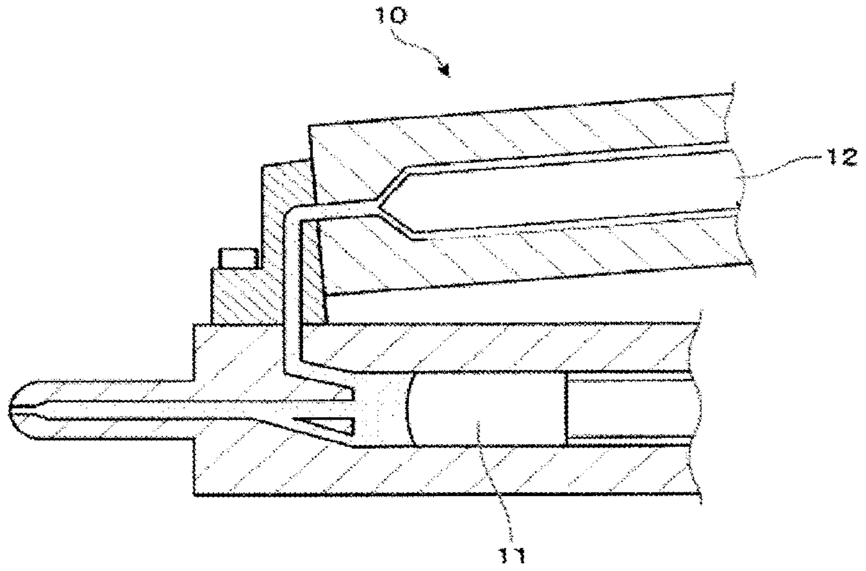
FIG. 1 is a schematic cross-sectional view of a filling device of the molding machine which can be used in the method for manufacturing a molded article of the invention.

In this specification, "including XX to YY carbon atoms" in the expression "a substituted or unsubstituted ZZ group including XX to YY carbon atoms" represents the number of carbon atoms when the ZZ group is unsubstituted, and does not include the number of carbon atoms of the substituent when the ZZ group is substituted. Here, "YY" is larger than "XX", and "XX" and "YY" independently mean an integer of 1 or more.

In this specification, "including XX to YY atoms" in the expression "a substituted or unsubstituted ZZ group including XX to YY atoms" represents the number of atoms when the ZZ group is unsubstituted, and does not include the number of atoms of the substituent when the ZZ group is substituted. Here, "YY" is larger than "XX", and "XX" and "YY" independently mean an integer of 1 or more.

The term "unsubstituted" in the context of "substituted or unsubstituted" means that the substituent is not bonded and a hydrogen atom is bonded.

In this specification, acrylate and methacrylate are collectively referred to as (meth)acrylate. Acrylic acid and methacrylic acid are collectively referred to as (meth)acrylic acid. Acrylo and methacrylo are collectively referred to as (meth)acrylo. Acrylic and methacrylic are collectively referred to as (meth)acrylic.

The thermosetting composition of the invention contains the following components (A-1), (A-2), (B), and (C), and having the viscosity of 5 to 200 Pa·s at a shear rate of 10 $s^{-1}$ at 25° C., and having the viscosity of 1 to 50 Pa·s at a shear rate of 100 $s^{-1}$ at 25° C., as measured by JIS K7117-2:1999 (measured at a constant shear rate with a rotating viscometer):

(A-1) an acrylate compound or a methacrylate compound in which a substituted or unsubstituted alicyclic hydrocarbon group including 6 or more ring carbon atoms is ester-bonded, (A-2) a compound represented by the following formula (1-1), (B) a spherical silica, (C) a white pigment.

(I-1)

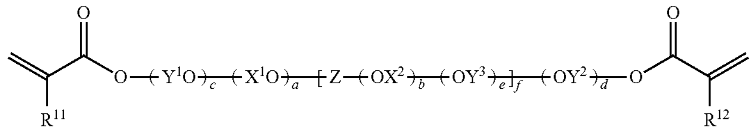

In the formula (I-1), $Y^1$, $Y^2$ and $Y^3$ independently represent a hydroxy substituted alkylene group including 1 to 10 (preferably 1 to 4, more preferably 3) carbon atoms or an alkylene group including 1 to 10 (preferably 1 to 4) carbon atoms;

$X^1$ and $X^2$ independently represent an alkylene group including 1 to 10 (preferably 1 to 4, more preferably 2 or 3) carbon atoms, or a hydroxy substituted alkylene group including 1 to 10 (preferably 1 to 4) carbon atoms;

Z represents $—Z^1—Z^2—Z^3—$, or $—Z^4—Z^5—Z^6—$;

$R^{11}$ and $R^{12}$ independently represent a hydrogen atom or a methyl group;

$Z^1$ and $Z^3$ independently represent a substituted or unsubstituted divalent aromatic hydrocarbon group including 6 to 12 (preferably 6 to 10) ring carbon atoms, or a substituted or unsubstituted divalent alicyclic hydrocarbon group including 6 to 12 (preferably 6 to 10) ring carbon atoms;

$Z^2$ represents $—C(CH_3)_2—$, $—C(CF_3)_2—$, $—CH_2—$, $—S(=O)_2—$, $—O—$ or $—C(=O)—$;

$Z^4$ and $Z^6$ independently represent a divalent organic group;

$Z^5$ represents a substituted or unsubstituted divalent fluorenyl group, or a substituted or unsubstituted divalent naphthyl group;

a and b independently represent an integer of 0 to 10 (preferably 0, 1 or 2); c, d and e independently represent 0 or 1; f represents an integer of 1 to 10 (preferably 1 to 5, more preferably 1 to 3);

$a+(b\times f)+c+d+(e\times f)$ is 2 or more (preferably 2 to 18, more preferably 2 to 12).

As a result, the filling property can be improved. In addition, it is possible to obtain a cured product with suppressed burrs and excellent heat resistance.

Specifically, it is assumed that, in the compound represented by the formula (1-1), the viscosity at the shear rate of $10\ s^{-1}$ and the viscosity at the shear rate of $100\ s^{-1}$ are increased as a result of obtaining appropriate thickening effects as a resin composition by hydrogen-bonding of a hydroxyl group, alkyl group, or the like, and as a result, burrs can be suppressed and the filling property can be improved.

Further, as an arbitrary effect, the continuous moldability can be improved, and the storing property at ambient temperature can be improved. In addition, a cured product having excellent light resistance can be obtained.

The viscosity at a shear rate of $10\ s^{-1}$ at 25° C. is 5 to 200 Pa·s, preferably 5 to 170 Pa·s, more preferably 5 to 150 Pa·s.

The viscosity at a shear rate of $100\ s^{-1}$ at 25° C. is 1 to 50 Pa·s, preferably 2 to 40 Pa·s, more preferably 3 to 40 Pa·s.

The measurement of the viscosity (measured at a constant shear rate with a rotating viscometer) based on JIS K 7117-2: 1999 is performed by using a viscoelasticity measurement device.

The component (A-1) is an acrylate compound or a methacrylate compound in which a substituted or unsubstituted alicyclic hydrocarbon group including 6 or more (preferably 6 to 30, more preferably 7 to 15) ring carbon atoms is ester-bonded.

Since the component (A-1) gives a polymer having a high glass transition point, heat resistance and light resistance of the obtained cured product can be improved.

From the viewpoint of enhancing the filling property of the components (B) and (C), the viscosity at a shear rate of $10\ s^{-1}$ at 25° C. of the component (A-1) is preferably 1 to 300 mPa·s, more preferably 2 to 200 mPa·s, and still more preferably 3 to 100 mPa·s, as measured by a rotating viscometer at a constant shear rate (JIS K7117-2: 1999).

The above viscosity is measured using a viscoelasticity measurement device.

Examples of the substituted or unsubstituted alicyclic hydrocarbon group including 6 or more ring carbon atoms of the component (A-1) include a substituted or unsubstituted adamantyl group, a substituted or unsubstituted norbornyl group, a substituted or unsubstituted isobornyl group, and a substituted or unsubstituted dicyclopentanyl group and cyclohexyl group, and a substituted or unsubstituted adamantyl group, a substituted or unsubstituted norbornyl group, a substituted or unsubstituted isobornyl group, and a substituted or unsubstituted dicyclopentanyl group are preferred.

As the component (A-1), compounds represented by the following formulas (I) to (IV) is preferred.

(I)

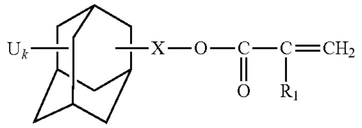

(II)

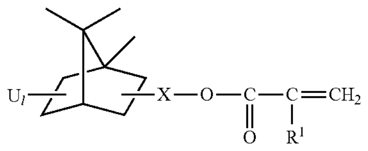

(III)

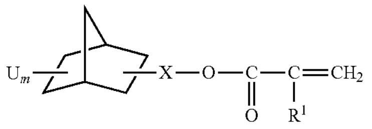

(IV)

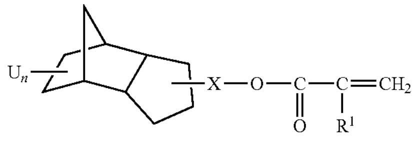

In formula (I), (II), (III) and (IV), $R^1$'s independently represent a hydrogen atom or a methyl group;

X's independently represent a single bond, an alkylene group including 1 to 4 (preferably 1 or 2) carbon atoms, or an oxyalkylene group including 1 to 4 (preferably 1 or 2) carbon atoms (X's are preferably single bonds);

U's independently represent a hydrogen atom, an alkyl group including 1 to 4 (preferably 1 or 2) carbon atoms, a halogen atom, a hydroxyl group, or a $=O$ group; k represents an integer of 1 to 15; I represents an integer of 1 to 8; m represents 1 to 11 integer; n represents an integer of 1 to 15;

when two or more U's are present, the two or more U's may be the same or different.

Examples of the alkylene group including 1 to 4 carbon atoms of X include, for example, a methylene group, an ethylene group, a trimethylene group, a propylene group, a tetramethylene group, a butylene group, a 2-methyltrimethylene group, and the like.

Examples of the oxyarkylene group including 1 to 4 carbon atoms of X include, for example, an oxymethylene group, an oxyethylene group, an oxypropylene group, an oxybutylene group, and the like.

The ═O group of U is a double-bond group of oxygen atom, and can be bonded with a carbon atom capable of removing two hydrogen atoms from the same carbon atom in an alicyclic hydrocarbon group of the compounds represented by the formula (I) to (IV) by removing two hydrogen atoms.

Examples of the alkyl group including 1 to 4 carbon atoms of U include a methyl group, an ethyl group, a propyl group (e.g., a n-propyl group, an isopropyl group), a butyl group (e.g., a n-butyl group, an isobutyl group), and the like.

Examples of halogen atom of U include a fluorine atom, a bromine atom, an iodine atom, and the like.

From the viewpoint of heat resistance, X is preferably a single bond.

The component (A-1) is more preferably adamantyl methacrylate, cyclohexyl methacrylate, 1-norbomyl methacrylate, 1-isobornyl methacrylate, or 1-dicyclopentanyl methacrylate, and more preferably 1-adamantyl methacrylate, 1-norbomyl methacrylate, 1-isobornyl methacrylate.

In this specification, examples of the substituent in the case of “substituted or unsubstituted” (hereinafter, also referred to as an arbitrary substituent) include an alkyl group including 1 to 6 carbon atoms, an alkoxy group including 1 to 6 carbon atoms, a halogen atom, a hydroxyl group, and the like.

Examples of the alkyl group including 1 to 6 carbon atoms (which is preferably linear or branched) include a methyl group, an ethyl group, a propyl group (e.g., a n-propyl group, an isopropyl group), a butyl group (e.g., a n-butyl group, an isobutyl group, a s-butyl group, a t-butyl group), a pentyl group (e.g., a n-pentyl group), a hexyl group, and the like.

Examples of the alkoxy group including 1 to 6 carbon atoms include a methoxy group, an ethoxy group, a propoxy group, a butoxy group, a pentyloxy group, a hexyloxy group, and the like.

Examples of the halogen atom include a fluorine atom, a bromine atom, an iodine atom, and the like.

The component (A-1) may be used alone or in combination of two or more kinds thereof.

Examples of the alkylene group including 1 to 10 carbon atoms of the divalent organic group of $Y^1$, $Y^2$, $Y^3$, $X^1$, $X^2$, $Z^7$ described below, and $Z^4$ and $Z^6$ described below include, for example, a methylene group, an ethylene group, a trimethylene group, a propylene group (e.g., a 1,2-propylene group), a tetramethylene group, a butylene group, a 2-methyltrimethylene group, a pentylene group, a hexylene group, a heptylene group, an octylene group, a nonylene group, a decylene group, and the like.

Examples of the hydroxy substituted alkylene group including 1 to 10 carbon atoms of $Y^1$, $Y^2$, $Y^3$, $X^1$, and $X^2$ (e.g., which is substituted by one or more, preferably one or two, hydroxy groups) include, for example, a group in which hydrogen atom of the alkylene group including 1 to 10 carbon atoms described above is substituted by a hydroxy group. A group represented by the following formula is preferable.

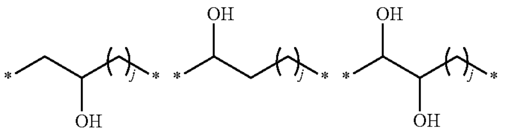

In the formula, each of “*” represents a chemical bonding site; and j's independently represent integer of 0 to 8 (preferably 0 to 3).

Examples of the divalent aromatic hydrocarbon group including 6 to 12 ring carbon atoms of $Z^1$ and $Z^3$ include a phenylene group, a biphenylenyl group, and the like.

Examples of the divalent alicyclic hydrocarbon group including 6 to 12 ring carbon atoms of $Z^1$ and $Z^3$ include a cyclohexylene group, a cycloheptylene group, a cyclooctylene group, a cyclononilene group, a cyclodecylene group, a cycloundecylene group, a cyclododecylene group, and the like.

Examples of the divalent organic group of $Z^4$ and $Z^6$ include a divalent aliphatic hydrocarbon group (including 1 to 10 carbon atoms, for example), a divalent aromatic hydrocarbon group (including 1 to 12 carbon atoms, for example), $—(Z^7O)—$, and the like.

$Z^7$ is an alkylene group including 1 to 10 (preferably 1 to 4) carbon atoms.

Examples of the divalent aliphatic hydrocarbon group of the divalent organic group of $Z^4$ and $Z^6$ include a (preferably linear or branched) alkylene group including 1 to 10 carbon atoms, a divalent alkynyl group including 2 to 10 carbon atoms, an alkenylene group including 2 to 10 carbon atoms, and the like.

Examples of the divalent aromatic hydrocarbon group of the divalent organic group in $Z^4$ and $Z^6$ include a substituted or unsubstituted phenylene group, a substituted or unsubstituted divalent biphenilenyl group, a substituted or unsubstituted naphthylene group, and the like.

Examples of the divalent fluorenyl group of $Z^5$ include a divalent 9,10-fluorenyl group, and the like.

Examples the divalent naphthyl group of $Z^5$ include a divalent 1,5-naphthalenyl group, a divalent 1,6-naphthalenyl group, a divalent 1,7-naphthalenyl group, a divalent 1,8-naphthalenyl group, a divalent 2,6-naphthalenyl group, and a divalent 2,7-naphthalenyl group, and the like.

From the viewpoint of improving the thermal deformability of the resulting molded article, it is preferable that $Y^1$, $Y^2$ and $Y^3$ be a hydroxy substituted propylen group, $Z^1$ and $Z^3$ be phenylene groups, and $Z^2$ be $—C(CH_3)_2—$.

Examples of commercially available products include epoxy ester 3002M, epoxy ester 3002MK, epoxy ester 3002A, epoxy ester 3000M, epoxy ester 3000MK, epoxy ester 3000A (the above are manufactured by Kyoeisha Chemical Co., Ltd.), and the like.

In addition, from the viewpoint of improving the thermal deformability of the resulting molded article, it is preferable that $Y^1$, $Y^2$ and $Y^3$ be a hydroxy substituted propylen group, $Z^1$ and $Z^3$ be a cyclohexylene group, and $Z^2$ be $—C(CH_3)_2—$.

The component (A-2) may be used alone or in combination of two or more kinds thereof.

The amount of the component (A-2) is preferably 0.1 to 50% by mass, based on 100% by mass of the total of the components (A-1), (A-2), (B) and (C).

When the amount is within the above range, the formability can be improved.

The component (B) is a spherical silica ($SiO_2$).

By containing the component (B), the refractive index of the obtained cured product can be increased. Further, it is possible to retain the fluidity of the thermosetting composition and to improve the filling properiesy at the time of molding.

Further, the amount of the component (C) can be increased to improve the material strength, reflectance, heat resistance, and light resistance.

The mean particle size (D50) of the component (B) is, for example, 0.1 to 100 μm, preferably 0.5 to 70 μm, and more preferably 1 to 50 μm, from the viewpoint of improving the filling property and suppressing the blockage of the molding channel.

The mean particle size (D50) of the component (B) is measured using a laser diffraction particle size distribution measuring equipment.

The mean particle size (D50) refers to the median diameter of the cumulative distribution, and means the diameter at which the larger side and the smaller side are equal when divided into two parts.

From the viewpoint of improving wettability and improving the strength of the cured product, the component (B) is preferably surface-treated spherical silica, and more preferably an acrylic silane surface-treated or a methacrylic silane surface-treated spherical silica.

The acrylic silane surface treatment or the methacrylic silane surface treatment can be performed using a silane coupling agent.

Examples of the silane coupling agent include 3-methacryloxypropylmethyldimethoxysilane, 3-methacryloxypropyltrimethoxysilane, 3-methacryloxypropylmethyldiethoxysilane, 3-methacryloxypropyltriethoxysilane, 3-acryloxypropyltrimethoxysilane, and the like. The time for the acrylic silane surface treatment or the methacrylic silane surface treatment is, for example, 30 to 120 minutes.

Examples of the component (B) include CRS1085-SF630 (manufactured by TATSUMORI LTD.), CRS1035-LER4: a spherical silica having a mean particle size (D50) of 4 μm (manufactured by TATSUMORI LTD.), S430-5PHM (manufactured by Nippon Steel & Sumikin Materials Co., Ltd. Micron Co.), and the like.

The component (B) may be used alone or in combination of two or more kinds thereof.

The amount of the component (B) is preferably from 10 to 90% by mass, more preferably from 20 to 85% by mass, still more preferably from 30 to 80% by mass, and particularly preferably from 35 to 80% by mass, based on the total of 100% by mass of the components (A-1), (A-2), (B) and (C).

Further, when one or more components selected from the group consisting of the components (D) to (F) described later are contained, the amount of the component (B) is preferably 10 to 90% by mass, more preferably 20 to 85% by mass, still more preferably 30 to 80% by mass, and particularly preferably 35 to 80% by mass, based on 100% by mass of the total of the components (A-1), (A-2), and (B) to (F).

When the amount is within the above range, the fluidity and the storing property at ambient temperature can be superior. In addition, it is possible to secure the strength of the cured product and further suppress burrs.

When two or more of the component (B) are combined, the amount of the component (B) is the sum of the two or more kinds of combinations.

The component (C) is a white pigment.

Specific examples of the component (C) include barium titanate, zirconium oxide, zinc oxide, boron nitride, titanium dioxide (titanium oxide), alumina, zinc sulfide, magnesium oxide, potassium titanate, barium sulfate, calcium carbonate, silicone particles, and the like. Among these, barium titanate, zirconium oxide, zinc oxide, boron nitride, and titanium dioxide are preferred from the viewpoint of high reflectance and availability, and titanium dioxide is preferred from the viewpoint of higher reflectance.

The crystal form of titanium dioxide may be a rutile type or an anatase type. From the viewpoint of light resistance, the rutile type is preferable.

The primary mean particle size of the component (C) is preferably 0.01 to 20 μm, more preferably 0.05 to 10 μm, and still more preferably 0.1 to 1 μm from the viewpoint of dispersibility.

The primary mean particle size of the component (C) can be determined using scanning electron microscope.

The primary mean particle size refers to the mean particle size of the primary particles. The primary particles are micro-solids which, when aggregated, tend to stick together adjacent micro-solids due to forces such as static electricity. For this reason, some micro-solids may form secondary particles (aggregated particles, or aggregates) which are stuck to each other.

In scanning electron microscopy, the primary particles appear as the smallest constituent units of the secondary particles in the form of millet-brittle in the secondary particles, so that their maximal length can be measured.

The component (C) may be a hollow particle from the viewpoint of improving the refractive index. The gas inside the hollow particle is usually air, but may be an inert gas such as nitrogen or argon, or may be a vacuum.

The component (C) may be appropriately surface-treated with a silicon compound, an aluminum compound, an organic substance, or the like. Examples of the surface treatment include a (meth)acrylsilane treatment, an alkylation treatment, a trimethylsilylation treatment, a silicone treatment, and to treatment with a coupling agent.

The component (C) may be used alone or in combination of two or more kinds thereof.

The amount of the component (C) is preferably from 1 to 50% by mass, more preferably from 3 to 50% by mass, still more preferably from 4 to 40% by mass, particularly preferably from 5 to 35% by mass, most preferably from 5 to 25% by mass or less, based on the total of 100% by mass of the components (A-1), (A-2), (B) and (C).

Further, when one or more components selected from the group consisting of the components (D) to (F) described later are contained, the amount of the component (C) is preferably 1 to 50% by mass, more preferably 3 to 50% by mass, still more preferably 4 to 40% by mass, particularly preferably 5 to 35% by mass, and most preferably 5 to 25% by mass or less, based on 100% by mass of the total of the components (A-1), (A-2), and (B) to (F).

When the amount is within the above range, the fluidity can be superior. In addition, it is possible to ensure whiteness of the cured product.

The curable composition of the invention may further contain a component (D) from the viewpoint of improving adhesion and wettability.

The component (D) is an acrylic acid, a methacrylic acid, or a monofunctional acrylate compound or methacrylate compound having a polar group (other than the component (A-1)).

Examples of the polar group include a hydroxyl group, an epoxy group, a glycidyl ether group, a tetrahydrofurfuryl group, an isocyanate group, a carboxyl group, an alkoxysilyl group, a phosphate ester group, a lactone group, an oxetane group, a tetrahydropyranyl group, an amino group, and the like.

Specific examples of the monofunctional (meth)acrylate compound having a polar group include 2-hydroxylethyl (metha)acrylate, 2-hydroxylpropyl(metha)acrylate, 2-hydroxylbutyl(metha)acrylate, 4-hydroxylbutyl(metha)acrylate (for example, trade name: 4-HBA, manufactured by Nihon Kasei Co., Ltd.), cyclohexanedimethanol mono (meth)acrylate (for example, trade name: CHMMA, manufactured by Nihon Kasei Co., Ltd.), glycidyl(metha)acrylate, and 4-hydroxybutylacrylate glycidyl ether (for example, trade name: 4-HBAGE, manufactured by Nihon Kasei Co., Ltd.), tetrahydrofurfuryl(meth)acrylate, 2-isocyanatoethyl (meth)acrylate, 2-(meth)acryloyloxyethyl succinate, 2-(meth)acryloyloxyethyl hexahydrophthalate, 3-(meth) acryloxypropyltrimethoxysilane, 3-(meth)acryloxypropylmethyldimethoxysilane, 3-(meth)acryloxypropyltriethoxysilane, 3-(meth)acryloxypropylmethyldiethoxysilane, 2-(meth)acryloyloxyethylphosphate, bis(2-(meth)acryloyloxyethyl)phosphate, KAYAMER PM-2 (trade name, manufactured by Nippon Kayaku Co., Ltd.), KAYAMER PM-21 (trade name, manufactured by Nippon Kayaku Co., Ltd.), γ-butyllactone(meth)acrylic acid, (meth)acrylic acid (3-methyl-3-oxetanyl), (meth)acrylic acid (3-ethyl-3-oxetanyl), tetrahydrofurfuryl(meth)acrylate, dimethylaminoethyl (meth)acrylate, diethylaminoethyl(meth)acrylate, and the like.

The component (D) may be used alone or in combination of two or more kinds thereof.

When the component (D) is contained, the amount of the component (D) is preferably from 0.1 to 40% by mass, more preferably from 0.5 to 15% by mass, and still more preferably from 1 to 25% by mass, based on 100% by mass of the total of the components (A-1), (A-2), and (B) to (F), from the viewpoint of adhesion.

The curable composition of the invention may further contain a component (E) from the viewpoint of adjusting viscosity, adjusting hardness of a cured product, suppressing cracking, and the like.

The component (E) is a monofunctional acrylate compound or methacrylate compound other than the components (A-1) and (D).

Examples of the component (E) include ethyl(meth)acrylate, n-butyl(meth)acrylate, isobutyl(meth)acrylate, t-butyl (meth)acrylate, 2-ethyl hexylmethacrylate, isodecyl(meth) acrylate, lauryl(meth)acrylate, stearyl(meth)acrylate, methyl (meth)acrylate, butoxyethylene glycol (meth)acrylate, methoxydiethylene glycol (meth)acrylate, butoxypolyethylene glycol (meth)acrylate, methoxypolyethylene glycol (meth)acrylate, urethane (meth)acrylate, and the like.

From the viewpoint of suppressing discoloration to yellow or the like during heat curing, it is preferable that the component (E) do not contain an aliphatic urethane structure (e.g., —NH—C(═O)—O—).

The component (E) may be used alone or in combination of two or more kinds thereof.

When the component (E) is contained, the amount of the component (E) is preferably from 0.1 to 80% by mass, more preferably from 0.5 to 60% by mass, and still more preferably from 1 to 50% by mass, based on 100% by mass of the total of the components (A-1), (A-2), and (B) to (F), from the viewpoint of toughness and adhesion.

From the viewpoint of mechanical strength and curing rate, the curable composition of the invention may further contain a component (F) within a range not inhibiting the effect of the invention.

The component (F) is a polyfunctional acrylate compound or methacrylate compound (preferably containing 2 to 5 functional groups) other than the component (A-2).

Examples of the component (F), tricyclodecanedimethanol di(meth)acrylate, 1,10-decanedioldi(meth)acrylate, 1,9-nonanedioldi(meth)acrylate, trimethylolpropanetri(meth) acrylate, dipropylene glycol di(meth)acrylate, alkoxylated hexanedioldi(meth)acrylate, alkoxylated aliphatic di(meth) acrylate, polyethylene glycol di(meth)acrylate, tetraethylene glycol di(meth)acrylate, tripropylene glycol di(meth)acrylate, and the like.

From the viewpoint of heat resistance, it is preferable that the component (F) do not contain an aliphatic urethane structure (e.g., —NH—C(═O)—O—).

The component (F) may be used alone or in combination of two or more kinds thereof.

When the component (F) is contained, the amount of the component (F) is preferably from 0.1 to 60% by mass, more preferably from 0.5 to 45% by mass, and still more preferably from 1 to 40% by mass, based on 100% by mass of the total of the components (A-1), (A-2), and (B) to (F), from the viewpoint of mechanical strength and curing rate.

From the viewpoint of toughness, the thermosetting composition of the invention further contains one or more components selected from the group consisting of the components (D) to (F), and preferably has the amount of the component (B) of 10 to 90% by mass and the amount of the component (C) of 1 to 50% by mass based on 100% by mass of the total of the components (A-1), (A-2), and (B) to (F).

The thermosetting composition of the invention may further contain a component (G) from the viewpoint of conditioning of viscosity, adjustment of hardness of the obtained cured product, and suppression of burrs.

The component (G) is a plate-like filler.

Examples of the component (G) include talc, kaolin, mica, clay, sericite, glass flake, synthetic hydrotalcite, various metallic foils, graphite, molybdenum disulfide, tungsten disulfide, boron nitride, plate-like iron oxide, plate-like calcium carbonate, plate-like aluminum hydroxide, and the like. Among them, talc, kaolin, mica, clay, graphite, and glass flake are preferred, and talc is more preferred in that a decrease in reflectance is not observed due to blending.

The mean particle size of the component (G) is preferably 0.5 to 30 μm, more preferably 2 to 15 μm.

When the mean particle size is within the above range, it is possible to suppress the occurrence of molding defects and defective products.

The mean particle size of the component (G) is measured using a laser diffraction particle size distribution measuring equipment.

The component (G) may be used alone or in combination of two or more kinds thereof.

When the component (G) is contained, the amount of the component (G) is, for example, 1 to 30% by mass, preferably 1 to 20% by mass, and more preferably 2 to 15% by mass, based on 100% by mass of the total of the components (A-1), (A-2), and (B) to (G).

The thermosetting composition of the invention may further include a component (H) from the viewpoint of conditioning of viscosity, storing property at ambient temperature, suppression of burrs, and the like.

Examples of the component (H) include silver, gold, silicon, silicon carbide, silica, copper oxide, iron oxide, cobalt oxide, titanium carbide, cerium oxide, ITO (indium tin oxide), ATO (antimony trioxide), hydroxyapatite, graphene, graphene oxide, monolayer carbon nanotube, multilayer carbon nanotube, fullerene, diamond, mesoporous carbon, and the like. The component (H) is preferably silicon carbide, silica, and titanium carbide, and is more preferably silica, titanium oxide or titanium carbide from the viewpoint of maintaining whiteness.

The primary mean particle size of the component (H) is preferably 0.005 to 0.1 μm.

The primary mean particle size of the component (H) can be determined using transmission electron microscope.

The component (H) may be used alone or in combination of two or more kinds thereof.

When the component (H) is contained, the amount of the component (H) is, for example, 0.05 to 10 parts by mass, preferably 0.07 to 5 parts by mass, and more preferably 0.08 to 3 parts by mass, based on 100 parts by mass of the total of the components (A-1), (A-2), and (B) to (G), from the viewpoint of storing property at ambient temperature and appearance of a cured product.

The thermosetting composition of the invention preferably further contains one or more components selected from the group consisting of the components (G) and (H).

As a result, it is possible to remarkably reduce the solid-liquid separation rate at the time of storing at ambient temperature.

The thermosetting composition of the invention may further contain an additive within a range not inhibiting the effect of the invention. Examples of the additive include a polymerization initiator, an antioxidant, a light stabilizer, an ultraviolet absorber, a plasticizer, an inorganic filler, a colorant, an antistatic agent, a lubricant, a mold release agent, a flame retardant, a leveling agent, a defoaming agent, and the like. Known additives can be used as these additives.

In order to promote the polymerization reaction, a polymerization initiator may be contained. The polymerization initiator is not particularly limited, and examples thereof include a radical polymerization initiator.

The radical polymerization initiator is not particularly limited, and examples thereof include ketone peroxides, hydroperoxides, diacyl peroxides, dialkyl peroxides, peroxyketals, alkyl peresters (peroxyesters), peroxycarbonates, and the like.

Specific examples of the ketone peroxides include methylethylketone peroxide, methylisobutylketone peroxide, acetylacetone peroxide, cyclohexanone peroxide, methylcyclohexanone peroxide, and the like.

Specific examples of the hydroperoxides include 1,1,3,3-tetramethylbutyl hydroperoxide, cumene hydroperoxide, t-butyl hydroperoxide, p-menthane hydroperoxide, diisopropylbenzene hydroperoxide, and the like.

Specific examples of the diacyl peroxides include diisobutyryl peroxide, bis-3,5,5-trimethylhexanol peroxide, dilauroyl peroxide, dibenzoyl peroxide, m-toluyl benzoyl peroxide, succinic acid peroxide, and the like.

Specific examples of the dialkyl peroxides include dicumylperoxide, 2,5-dimethyl-2,5-di(t-butylperoxy)hexane, 1,3-bis(t-butylperoxyisopropyl)hexane, t-butylcumylperoxide, di-t-butylperoxide, di-t-hexylperoxide, 2,5-dimethyl-2,5-di (t-butylperoxy)hexin-3, and the like.

Specific examples of the peroxyketals include 1,1-di-t-hexylperoxy-3,3,5-trimethylcyclohexane, 1,1-di-t-hexyl peroxycyclohexane, 1,1-di-t-butylperoxy-2-methylcyclohexane, 1,1-di-t-butylperoxycyclohexane, 1,1-di-(t-amylperoxy)cyclohexane, 2,2-di(t-butylperoxy)butane, 4,4-bis-t-butylperoxypentanoic acid butyl, and the like.

Specific examples of the alkyl peresters (peroxyesters) include 1,1,3,3-tetramethylbutylperoxyneodecanoate, α-cumylperoxyneodecanoate, t-butylperoxyneodecanoate, t-hexylperoxyneodecanoate, t-butylperoxyheptanoate, t-hexylperoxypivalate, t-butylperoxypivalate, 1,1,3,3-tetramethylbutylperoxy-2-ethylhexanoate, t-amylperoxy-2-ethylhexanoate, t-butylperoxy-2-hexanoate, t-butylperoxyisobutylate, di-t-butylperoxyhexahydroterephthalate, 1,1,3,3-tetramethylbutylperoxy-3,5,5-trimethylhexanoate, t-amylperoxy-3,5,5-trimethylhexanoate, t-butylperoxy-3,5,5-trimethylhexanoate, t-butylperoxyacetate, t-butylperoxybenzoate, dibutylperoxytrimethyladipate, 2,5-dimethyl-2,5-di-2-ethylhexanoylperoxyhexane, t-hexylperoxy-2-ethylhexanoate, t-hexylperoxyisopropylmonocarbonate, t-butylperoxylaurate, t-butylperoxyisopropylmonocarbonate, t-butylperoxy-2-ethylhexylmonocarbonate, 2,5-dimethyl-2,5-di-benzoylperoxyhexane, and the like.

Specific examples of the peroxycarbonates include di-n-propylperoxydicarbonate, di-isopropylperoxycarbonate, di-4-t-butylcyclohexylperoxycarbonate, di-2-ethylhexylperoxycarbonate, di-sec-butylperoxycarbonate, di-3-methoxybutylperoxydicarbonate, di-2-ethylhexylperoxydicarbonate, di-isopropyloxydicarbonate, t-amylperoxyisopropylcarbonate, t-butylperoxyisopropylcarbonate, t-butylperoxy-2-ethylhexylcarbonate, 1,6-bis(t-butylperoxycarboxyloxy) hexane, and the like.

Examples of the polymerization initiator include perbutyl E and perhexa HC.

The polymerization initiator may be used alone or in combination of two or more kinds thereof.

When the polymerization initiator is contained, the amount of the radical polymerization initiator is preferably 0.001 to 20 parts by mass based on 100 parts by mass of the total of the components (A-1), (A-2), and (B) to (G).

Examples of the antioxidant include a phenol-based antioxidant, a phosphorus-based antioxidant, a sulfur-based antioxidant, a vitamin-based antioxidant, a lactone-based antioxidant, an amine-based antioxidant, and the like.

Examples of the phenolic antioxidant include tetrakis [methylene-3-(3,5-di-t-butyl-4-hydroxyphenyl)propionate] methane, 13-(3,5-di-t-butyl-4-hydroxyphenyl)propionate stearyl ester, 1,3,5-trimethyl-2,4,6-tris(3,5-di-t-butyl-4-hydroxybenzyl)benzene, tris(3,5-di-t-butyl-4-hydroxybenzyl) isocyanurate, tris[(3,5-di-t-butyl-4-hydroxyphenyl)propionyloxyethyl]isocyanurate, 2,6-di-t-butyl-4-methylphenol, 3,9-bis[1,1-dimethyl-2-{β-(3-t-butyl-4-hydroxy-5-methylphenyl)propionyloxy}ethyl]-2,4,8,10-tetraoxaspiro[5,5] undecane, tris(2,6-dimethyl-3-hydroxy-4-t-butylbenzyl)isocyanurate and the like. Commercial products such as IRGANOX 1010, IRGANOX 1076, IRGANOX 1330, IRGANOX 3114, IRGANOX 3125, IRGANOX 3790 (the above are manufactured by BASF SE), CYANOX 1790 (manufactured by Cyanamid Company), and SUMILIZER BHT, SUMILIZER GA-80 (the above are manufactured by Sumitomo Chemical Company, Limited) can be used (all are trade names).

Examples of the phosphorus-based antioxidant include tris(2,4-di-t-butylphenyl)phosphite, 2-[[2,4,8,10-tetrakis(1,1-dimethylethyl)dibenzo[d,f][1,3,2]dioxaphosphepin-6-yl]oxy]-N,N-bis[2-[[2,4,8,10-tetrakis(1,1-dimethylethyl) dibenzo[d,f][1,3,2]dioxaphophin-6-yl]oxy]ethyl] ethanamine, cyclic neopentanetetraylbis(2,6-di-t-butyl-4-methylphenyl)phosphite, distearyl pentaerythritol diphosphite, and the like. Commercial products such as IRGAFOS 168, IRGAFOS 12, IRGAFOS 38 (the above are manufactured by BASF SE), ADK STAB 329K, ADK STAB PEP36, ADK STAB PEP-8 (manufactured by ADEKA CORPORATION), Sandstab P-EPQ (manufactured by Clariant AG), and Weston 618, Weston 619G, Weston 624 (the above are manufactured by General Electric Company) can be used (all are trade names).

Examples of the sulfur-based antioxidant include dilaurylthiodipropionate, distearylthiodipropionate, dimyristylthiodipropionate, laurylstearylthiodipropionate, pentaerythritol tetrakis(3-dodecylthiopropionate), pentaerythritol tetrakis(3-laurylthiopropionate), and the like. Commercial products such as DSTP "yoshitomi", DLTP "yoshitomi", DLTOIB, DMTP "yoshitomi" (the above are manufactured by API Corporation), Seenox 412S (manufactured by SHIPRO KASEI KAISHA, LTD.), Cyanox 1212 (manufactured by Cyanamid Company), and SUMILIZER TP-D (manufactured by Sumitomo Chemical Company, Limited) can be used (all are trade names).

Examples of the vitamin-based antioxidant include tocopherol, 2,5,7,8-tetramethyl-2-(4',8',12'-trimethyltridecyl)coumaron-6-ol and the like. Commercial products such as IRGANOX E201 (manufactured by BASF SE) can be used.

Examples of the lactone-based antioxidant include those described in JPH07-233160 and JPH07-247278 can be used. Further, HP-136 (trade name, manufactured by BASF SE, compound name: 5,7-di-t-butyl-3-(3,4-dimethylphenyl)-3H-benzofuran-2-one) and the like can be used.

Examples of the amine-based antioxidant include commercial products such as IRGASTAB FS 042 (manufactured by BASF SE), GENOX EP (manufactured by Crompton Corporation, compound name: dialkyl-N-methylamineoxide) can be used (all are trade names).

The antioxidant may be used alone or in combination of two or more kinds thereof.

When the antioxidant is contained, the amount of the antioxidant is preferably from 0.001 to 20 parts by mass based on 100 parts by mass of the total of the components (A-1), (A-2), and (B) to (G), from the viewpoint of not inhibiting the effect of the invention.

As the light stabilizer, any one such as an ultraviolet absorber or a hindered amine light stabilizer can be used, but is preferably a hindered amine light stabilizer.

Specific examples of the hindered amine-based photostabilizer include ADK STAB LA-52, LA-57, LA-62, LA-63, LA-67, LA-68, LA-77, LA-82, LA-87, LA-94 (manufactured by ADEKA Corporation), Tinuvin 123, 144, 440, 662, 765, 770DF, Tinuvin XT 850 FF, Tinuvin XT 855 FF, Chimassorb 2020, 119, 944 (the above are manufactured by BASF SE), Hostavin N30 (manufactured by Hoechst AG), Cyasorb UV-3346, UV-3526 (CYTEC INDUSTRIES INC.), Uval 299 (manufactured by GLC), and Sanduvor PR-31 (manufactured by Clariant AG) can be used (all are trade names).

Specific examples of the ultraviolet absorber include Adecastab LA-31, Adecastab LA-32, Adecastab LA-36, Adecastab LA-29, Adecastab LA-46, Adecastab LA-F70, Adecastab 1413 (the above are manufactured by ADEKA Corporation), and Tinuvin P, Tinuvin 234, Tinuvin 326, Tinuvin 328, Tinuvin 329, Tinuvin 213, Tinuvin 571, Tinuvin 765, Tinuvin 1577ED, Chimassorb 81, Tinuvin 120 (the above are manufactured by BASF SE) can be used (all are trade names). Among these, Tinuvin series manufactured by BASF SE is preferred, and Tinuvin 765 is more preferred.

The light stabilizer may be used alone or in combination of two or more kinds thereof.

When the light stabilizer is contained, the amount of the light stabilizer is preferably from 0.001 to 20 parts by mass based on 100 parts by mass of the total of the components (A-1), (A-2), and (B) to (G), from the viewpoint of not inhibiting the effect of the invention.

Examples of the mold release agent include an internal mold release agent and the like.

With respect to the internal mold release agent, it is preferable that it is dissolved and well dispersed in the (meta)acrylate compound; further, it becomes to have releasability because it is likely to conduct the molecular motion by being in a molten state with a low viscosity at the time of curing, it is separated from the resin component to be cured at the time of curing, and it exists between the mold and the cured component; it also has improved mold releasability by having low viscosity in the molten state at the time of mold release. Although there is no special designation for an internal mold release agent, an aliphatic compound is preferable.

The aliphatic compound used as an internal mold release agent preferably has a melting point in the range of −40° C. to 180° C., and more preferably in the range of −30° C. to 180° C. By setting the melting point of the aliphatic compound to −40° C. or higher, no bubbles or the like are generated in the product by vaporizing at the time of curing, so that no appearance defect is caused, and good releasability is exhibited. Further, by setting the melting point of the aliphatic compound to 180° C. or less, solubility is improved and good appearance and releasability are obtained.

As the above aliphatic compound, a compound represented by the following formula (V) is preferred.

(V)

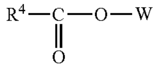

In the formula (V), $R^4$ represents an aliphatic hydrocarbon group including 6 to 30 carbon atoms;

W represents a hydrogen atom, a metal atom or a hydrocarbon group including 1 to 8 carbon atoms;

when W is metal atom, O and W are ionically bonded.

The aliphatic hydrogen group of $R^4$ of the formula (V) may be a straight-chain or branched structure, and the bonding states in the molecular chain may be a single bond alone or may contain multiple bonds. Specific examples thereof include a saturated aliphatic hydrocarbon group and anunsaturated aliphatic hydrocarbon group, and the like. The number of multiple bonds in the unsaturated aliphatic hydrocarbon group may be one or more.

The hydrocarbon group of $R^4$ of the formula (V) includes 6 to 30 carbon atoms. When the number of carbon atoms is less than 6, the aliphatic compound volatilizes at the time of curing, or the like, and there is a possibility that the releasability is not developed due to the absence of the aliphatic compound between the mold and the raw material, or that bubbles remain in the raw material. When the number of carbon atoms is more than 30, the mobility of the material is reduced, and an aliphatic compound is incorporated into the material to make the material opaque or the releasability does not develop. The number of carbon atoms of the hydrocarbon group in $R^4$ of the formula (V) is preferably 6 to 26, more preferably 8 to 22.

Examples of the metal atom in W of the formula (V) include alkali metals such as lithium and sodium, alkaline earth metals such as magnesium and calcium, zinc, and aluminum.

When W is an alkaline earth metal or aluminum, since W is divalent or more, the formula (V) of the aliphatic compound is represented by $(R^4\text{—CO—O})_q\text{—W}$ and q is 2 to 4.

The aliphatic hydrocarbon group in W of the formula (V) may be a straight-chain or branched structure, and the bonding states in the molecular chain may be a single bond alone or may contain multiple bonds. Specific examples thereof include an aliphatic saturated hydrocarbon group and an aliphatic unsaturated hydrocarbon group.

The number of multiple bonds in the unsaturated aliphatic hydrocarbon group may be one or more. The number of carbon atoms of the aliphatic hydrocarbon group of W is 1 to 8 carbon atoms. When the number of carbon atoms is 8 or more, an increase of the melting point or a decrease of solubility of the aliphatic compound may be caused, and the aliphatic compound may be incorporated into the resin component during curing, or may be unevenly distributed, so that the releasability may not be developed or the resin component may be opaque. The preferred number of carbon atoms of the aliphatic hydrocarbon group of W is 1 to 6 carbon atoms.

In order to develop good releasability, when W of the aliphatic compound represented by the formula (V) is a hydrogen atom, it is preferable that $R^4$ of the formula (V) be an aliphatic hydrocarbon group including 6 to 20 carbon atoms. When W is a metal atom, it is preferable that $R^4$ of the formula (V) is a aliphatic hydrocarbon group including 6 to 18 carbon atoms. When W is an aliphatic hydrocarbon group, the sum of the number of carbon atoms of $R^4$ of the formula (V) and the aliphatic hydrocarbon group of W is preferably 7 to 30.

Examples of the mold release agent include magnesium stearate and zinc stearate.

When a mold release agent is contained, the amount of the mold release agent is 0.001 to 20 parts by mass based on 100 parts by mass of the total of the components (A-1), (A-2), and (B) to (G).

When the amount is within the above range, the transferability of mold shape and the shape stabilization against heat can be maintained, and the releasability can be satisfactorily developed.

The amount of the component (A-1) is preferably 5 to 40 parts by mass, more preferably 10 to 30 parts by mass, based on the total of 100 parts by mass of the components (A-1), (A-2), (D) to (H), and additives (components (D) to (H) and additives which are not contained are calculated as 0 parts by mass).

The amount of the component (A-2) is preferably 5 to 80 parts by mass, more preferably 5 to 50 parts by mass, based on the total of 100 parts by mass of the components (A-1), (A-2), (D) to (H), and additives (components (D) to (H) and additives which are not contained are calculated as 0 parts by mass).

The thermosetting composition of the invention consists essentially of components (A-1), (A-2) and (B) to (C), and optionally (D) to (H) and additives, and may contain other unavoidable impurities within a range not impairing the effects of the invention.

For example, 85% by mass or more, 95% by mass or more, or 99% by mass or more, or 100% by mass of the thermosetting composition of the invention may consist of:

components (A-1), (A-2) and (B) to (C);

components (A-1), (A-2) and (B) to (F); or components (A-1), (A-2) and (B) to (C), and optionally (D) to (H) and additives.

The thermosetting composition of the invention can be prepared by mixing each of the above components in a predetermined amount ratio. The method for mixing is not particularly limited, and any known methods such as an agitator (mixer) can be used. The mixing can be performed at ambient temperature, cooling, or heating, at ambient pressure, under reduced pressure, or under increased pressure.

The thermosetting composition of the invention is a material suitable, for example, as a reflector for optical semiconductor, and can reduce warpage and unfilling of the molded body of the lead frame which may occur during manufacturing of the emitting device. Further, the mass productivity and the lifetime of the optical reflectance of the emitting device can be improved, the burrs generated after the molding can be suppressed, and the deburring can be omitted. As a result, the quality of the molded body after the electrolysis-resistant treatment can be improved.

In addition, the thermosetting composition of the invention can increase the time which can be used under the use temperature at the time of molding.

The method for manufacturing a molded article contains a step of supplying the thermosetting composition into a plunger (supplying step); filling the supplied thermosetting composition into a molding part of a mold having a molding part (cavity) by the plunger (filling step); thermosetting the filled thermosetting composition in the molding part (curing step); and extruding the thermosetting resin, which is cured (releasing step).

In the method of the invention, transfer molding such as LTM (Liquid Transfer Molding) molding, compression molding, or injection molding such as LIM (Liquid Injection Molding) molding are preferable from the viewpoint of preventing only the resin components from being filled. Pre-polymerization may be performed.

By using the above-described thermosetting composition, when the inside of the mold is filled by applying a pressure, or when the holding pressure after filling is excessively applied, the thermosetting composition can be filled even in a gap of 1 μm.

In a transfer molding, a transfer molding machine (e.g., a liquid transfer molding machine G-Line) can be used, for example, to mold with a clamping force of 5 to 20 kN and at a molding temperature of 100 to 190° C. for a molding time of 30 to 500 seconds, and preferably at a molding temperature of 100 to 180° C. for a molding time of 30 to 180 seconds.

Post-curing may be performed, for example, at 150 to 185° C. for 0.5 to 24 hours.

In a compression molding, a compression molding machine can be used to mold, for example, at a molding temperature of 100 to 190° C. for a molding time of 30 to 600 seconds, preferably at a molding temperature of 110 to 170° C. for a molding time of 30 to 300 seconds.

Post-curing may be performed, for example, at 150 to 185° C. for 0.5 to 24 hours.

In a liquid injection molding, for example, a liquid thermosetting resin injection molding machine LA-40S can be used, for example, to mold with a clamping force of 10 kN to 40 kN and at a molding temperature molding temperature of 100 to 190° C. for a molding time of 30 to 500 seconds, preferably at a molding temperature of 100 to 180° C. for a molding time of 20 to 180 seconds.

The molding machine described above preferably contains a mold having a plunger and a molding part. The molding machine described above preferably further contains a shut-off nozzle.

FIG. 1 shows an embodiment of a filling device of a molding machine in which the method for injection molding of the invention can be performed.

The molding machine of FIG. 1 is an injection molding machine having a plunger mechanism for extruding the thermosetting composition of the invention into a mold, wherein the injection molding machine has a filling device 10 having a plunger 11 shown in FIG. 1; a mold 20 having a cavity 21 shown in FIG. 2(A); and although not shown in the drawings, the machine has a pressure reducing device as a degassing device connected to pores for degassing the cavity 21 in the mold 20; a heating device as a heating means connected to the mold 20; and a cooling device. The molding material is a thermosetting composition of the invention.

As the filling device 10, a well-known filling device having a plunger can be used. Usually, the filling device 10 having the plunger 11 is provided with a feed part and a check prevention function as shown in FIG. 1, and the anti-check valve 12 (the check valve may be a screw-shaped) is moved back and forth to feed, stir, and mix the material introduced from a slot not shown, but in the embodiment, the thermosetting composition, which is a homogeneous liquid, is fed in and therefore does not need to be stirred and mixed.

By means of a plunger, in the step of filling the cavity, it is preferable that the thermosetting composition be filled into the cavity in the mold via a flow path which is temperature-controlled to 50° C. or less. When the method for molding of the invention is performed using the device shown in FIG. 2, the flow path corresponds to the flow path of the thermosetting composition in the filling device 10 (not shown) and the introduction path in the mold 20.

In the method of the invention, a gating system for blocking the flow of curing liquid and the transfer of heat to and from the flow path between the plunger and the cavity in the step of filling the cavity in the mold with the thermosetting composition filled in the plunger by the plunger is preferably provided. Hereinafter, a method for molding of the invention will be described with reference to FIG. 2.

Figure 2:
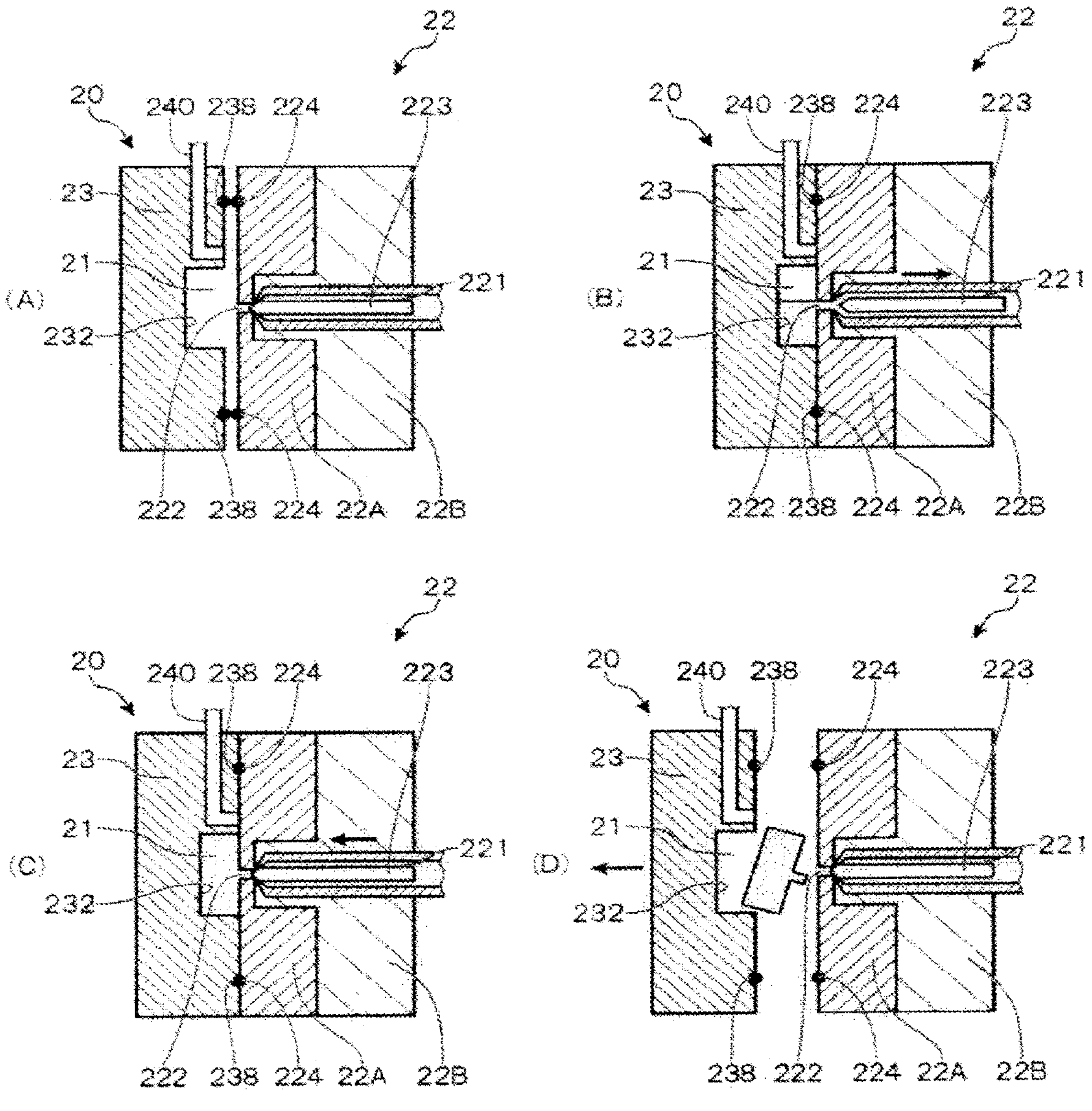
FIG. 2 is a schematic cross-sectional view of a mold which can be used in the method for manufacturing a molded article of the invention.

When the method of the invention is performed using the device shown in FIG. 2, for example, the needle 223 and the opening 222 correspond to the gating system. As described above, the needle 223 moves toward the movable mold 23, and the opening 222 is closed, whereby the introducing path 221 is cut off in front of the heating part 22A, and the thermosetting composition introduced into the introducing path 221 remains in the cooling part 22B, and the flow of the thermosetting composition and the transfer of heat can be blocked. Examples of the system which can block the flow of the thermosetting composition and the transfer of heat include a valve gate system and a blocking nozzle system, etc.

The heating device is a device for heating the heating part 22A and the movable mold 23. By heating these components, the temperature in the cavity (also referred to as "cavity temperature") can be a predetermined temperature. In the method of the invention, the temperature of the mold 232 constituting the cavity part is preferably set to a temperature of 100° C. or more and 180° C. or less.

The cooling device is a device for cooling the flow path of the thermosetting composition. Specifically, it is preferable to cool the filling device 10 and the cooling part 22B of the mold 20 to 10° C. or more and 50° C. or less.

In the case of injection molding, the needle of FIG. 1 (not shown) and the needle 223 of FIG. 2 corresponds, and the flow path of FIG. 1 (not shown) and the introducing path 221 of FIG. 2 corresponds.

FIG. 1 shows the supplying step.

In the case of transfer molding or compression molding, the weighing can be performed by inserting an appropriate amount of the raw material into the plunger 11 using a feeding device such as a syringe (not shown).

In the case of injection molding, the thermosetting composition is injected into the filling device 10 shown in FIG. 1 through an inlet not shown. The introduced thermosetting composition is extruded into an anti-check valve 12, and then a predetermined amount is weighed in a plunger 11. After weighing is completed or before injection, the anti-check valve 12 is advanced, and functions as a check valve when the plunger 11 is operated. During this time, since the flow path is cooled by the cooling device, the thermosetting composition flows smoothly without curing.

The filling step is shown, for example, in FIG. 2(B).

When the thermosetting composition is injected into the cavity, it is preferred to vent the air in the cavity or to depressurize the cavity with pores connected to a depressuring device, such as the depressuring tube 240 of FIG. 2, which enables the pressure in the cavity to be reduced. The reason is that in the step of injecting the thermosetting composition and completely filling the cavity, the vent allows the air in the cavity to escape, and the vacuum in the cavity allows the thermosetting composition to be completely filled by leaving the cavity free of air. In the absence of this mechanism, it may be preferable to have a mechanism that allows air in the cavity to escape when the raw material is filled (e.g., a vent mechanism).

To mold the thermosetting composition, first, the movable mold 23 is brought close to the fixed mold 22 and clamped (FIG. 2(A)). The elastic member 238 of the movable mold 23 stops moving the movable mold 23 once with a position that abuts the elastic member 224 of the fixed mold 22.

The filling of the cavity with the thermosetting composition is preferably performed by opening the gate of the gating system (moving the needle 223 towards the fixed mold 22) and filling the cavity 21 in the mold with the thermosetting composition. The heater part 22A provided in the movable mold 23 and the fixed mold 22 is constantly warmed, and the cavity temperature is set to be, for example, 60° C. or more, preferably 100° C. or more and 180° C. or less, particularly preferably 110° C. or more and 170° C. or less.

When an injection molding machine is used, the nozzle of the shut-off nozzle (in some cases, the valve gate) is opened to move the plunger of the injection part and the thermosetting component is injected into the cavity when starting inject from the injection part to the cavity. When a transfer molding machine is used, it is only necessary to allow the raw material to flow into the cavity in order to cure all the components from the inside of the plunger to the cavity, and it is not necessary to block the transfer of heat.

The curing step is shown, for example, in FIG. 2(C).

When filling of the thermosetting composition into the cavity 21 is completed, curing of the thermosetting composition is simultaneously started. In order to improve transferability of the molded article, curing is preferably performed by applying a predetermined pressure. That is, it is preferable that the plunger 11 be in a state of being pressurized to 1.0 MPa or more and 30 MPa or less. The pressure applied to the thermosetting composition in order to improve transferability is referred to as a holding pressure.

The curing step preferably contains holding pressure (increasing the pressure applied to the thermosetting composition) after initiation of thermosetting and before completion of curing, and then closing the gate of the gating system to perform thermosetting. Specifically, the gate is closed by advancing the needle 223 to close the opening 222. In the molding step, the cooling device is activated to cool the entire flow path of the thermosetting composition, i.e., the cooling part 22B provided in the filling device 10 and the fixed mold 22 of the mold 20 of the molding machine. At this time, the entire flow path is preferably maintained at 10° C. or more, 50° C. or less, particularly preferably set to 30° C. or less.

Figure 3:
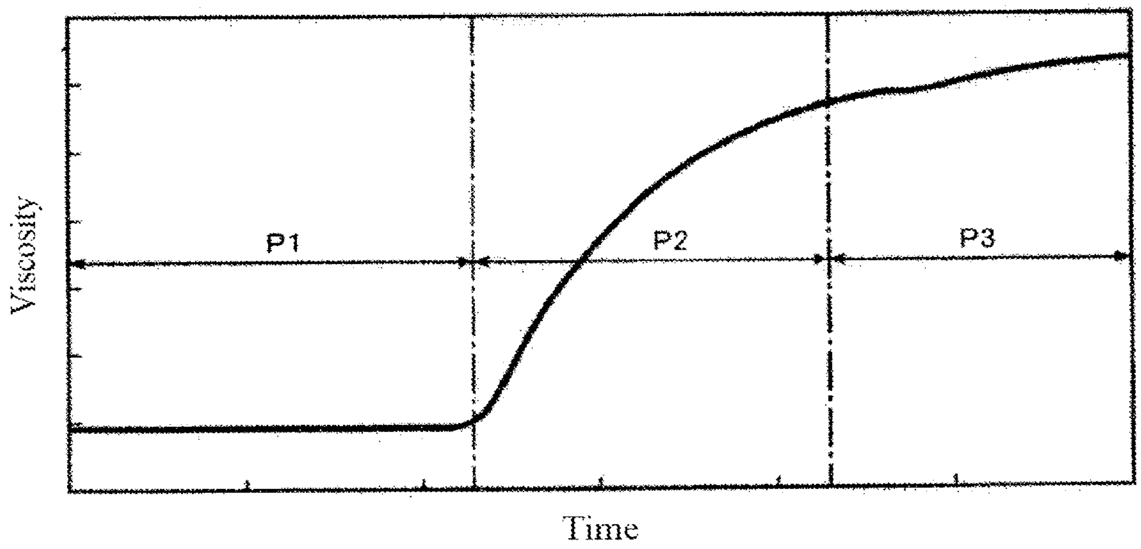
FIG. 3 is a diagram showing a relation between the viscosity of the thermosetting composition and time in one embodiment of the method for manufacturing a molded article of the invention.

Hereafter, the holding pressure of the plunger 11 and the timing of the start of the holding pressure will be described. FIG. 3 shows the relation between the viscosity of the thermosetting composition and time in the embodiment. In FIG. 3, the period P1 between inject of the raw material into the cavity and the completion of the filling corresponds to the induction phase until the raw material is heated and cured. The curing step is divided into two stages: an initial phase of curing P2, which is the period between when the material begins to cure with heat and when the raw material is cured, and the latter phase of curing P3, in which curing is completed. In the induction phase P1, the viscosity of the thermosetting composition does not change while remaining at a low viscosity, and in the initial phase of curing P2, a remarkable viscosity change from a low viscosity to a high viscosity is exhibited, and in the latter phase of curing P3, the viscosity increases slowly in a state of a high viscosity.

In the initial phase of curing P2, not only a viscosity change in which the thermosetting composition changes from a liquid to a solid but also a volume change occurs, thereby shrinking. Therefore, in the actual molding, without applying pressure to the thermosetting composition, the molded article is inferior in transferability. In order to improve transferability, it is preferable that a pressure be applied to the thermosetting composition (holding pressure), and that the thermosetting composition be brought into close contact with the mold 20 and the thermosetting composition be supplemented from the gate part.

However, in the thermosetting composition of the embodiment, when pressure is applied in a low-viscosity state, the raw material leaks from the gap between the fixed mold 22 and the movable mold 23 and hardens (burrs), or malfunction of the extrusion pin due to penetration of the thermosetting composition into the gap around the extrusion pin may occur. On the other hand, even when a pressure is applied in a state in which the viscosity is increased at the initial phase of curing P2 or in a state of the latter phase of curing P3, the viscosity of the thermosetting composition is high, so that the thermosetting composition cannot be compressively deformed and the transferability cannot be improved. Therefore, in order to obtain a molded article having a high transferability, it is preferable to adjust the timing of the start of holding pressure (holding pressure start time T) to the timing of shifting from the induction phase P1 to the initial phase of curing P2 of the curing step.

Here, if the viscosity of the thermosetting composition in the cavity 21 can be detected, the holding pressure start time T can be determined.

The thermosetting composition in the embodiment thickens at an initial phase of curing P2 and starts to shrink at the same time, so that it is preferable to detect a time to start shrinking. As a result, the holding pressure start time T can be appropriately determined.

In the curing step, by holding pressure under the above-mentioned conditions, sinking and distortion of the molded article can be prevented, and the transferability can be improved.

After completion of the holding pressure for a certain period of time, the needle 223 is advanced as shown in FIG. 2(C) to close the opening 222, and the thermosetting composition is heated for a certain period of time to complete curing so as not to generate an uncured portion.

Here, by advancing the plunger 11, the thermosetting composition is filled in the cavity 21 of the mold 20, the time required for filling is defined as $t_1$. When the filling is completed, the plunger 11 stops. Further, when curing of the thermosetting composition is started, shrinking of the thermosetting composition occurs at the same time, so that the plunger 11 which has stopped after completion of the filling step starts advancing again. The time required from the completion of the filling step until the plunger 11 starts to advance again due to shrinking is defined as $t_2$. When the time required to completely cure the thermosetting composition by further heating is defined as $t_3$, $t_1$-$t_2$+$t_3$ (the total time required for the filling and curing steps) is preferably 0.2 minutes to 3 minutes, more preferably 0.2 minutes to 2 minutes. When the total time is 0.2 minutes or less, uncured may occur, and when the total time is 3 minutes or more, it is not preferable from the viewpoint of mass productivity.

The releasing step is shown, for example, in FIG. 2(D).

By separating the movable mold 23 from the fixed mold 22, it is possible to take out the cured product in the cavity. If the releasability is poor, an ejector may be provided in the mold as appropriate.

The cured product of the invention can be produced using the thermosetting composition described above.

The cured product of the invention is preferably a molded article.

The cured product of the invention can be suitably used, for example, as a reflector for an optical semiconductor emitting device. The reflector using the cured material of the invention does not decrease in reflectance even when used for a long time, has a high reflectance in the visible light region, is excellent in heat resistance and weather resistance, and is excellent in adhesion with peripheral members.

The reflector described above has a high reflectivity of the visible light region and the decrease in reflectivity is small even when used for a long time. The light reflectance of the reflector at a wavelength of 450 nm is preferably 85% or more, more preferably 90% or more, still more preferably 93% or more in an initial value, and the amount of decrease in the light reflectance after a deterioration test at 150° C. for 1,000 hours from the initial reflectance is preferably 20% or less, more preferably 15% or less, and still more preferably 10% or less. The light reflectance is determined by the method described in the Examples.

The optical semiconductor emitting device described above contains the reflector described above. Other known configurations of the optical semiconductor light emitting device can be adopted.

Figure 4:
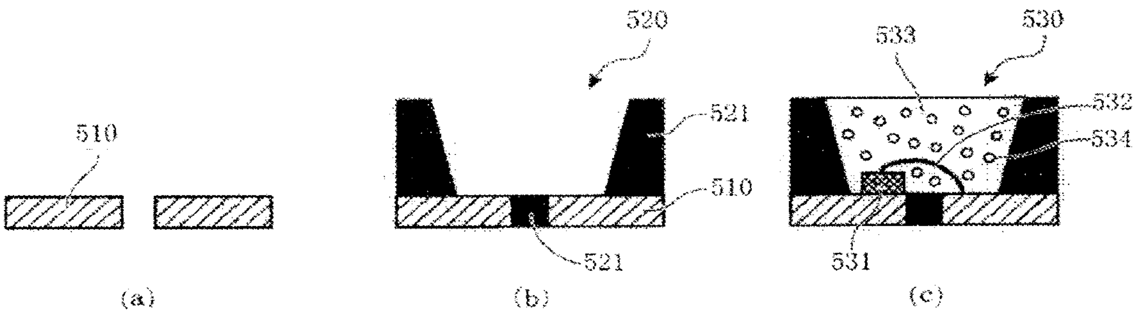
FIG. 4 is a schematic cross-sectional view showing one embodiment of a substrate for mounting an optical semiconductor device using the thermosetting composition of the invention and the optical semiconductor device.

A substrate for mounting an optical semiconductor device, and an optical semiconductor emitting device will be described further with reference to drawings. FIG. 4 is a schematic cross-sectional view showing an embodiment of a substrate for mounting an optical semiconductor device, and an optical semiconductor device. FIG. 4(*a*) shows a lead frame 510.

FIG. 4(*b*) shows a substrate for mounting an optical semiconductor device 520 in which a cured product is molded as a reflector 521 to the lead frame 510 of FIG. 4(*a*). A substrate for mounting an optical semiconductor device 520 has a concave portion composed of a bottom surface made of the lead frame 510 and the reflector 521, and an inner peripheral side surface made of the reflector 521. The cured product constituting the reflector 521 is obtained by curing the thermosetting composition of the invention.

FIG. 4(*c*) shows shows an optical semiconductor emitting device 530, in which an optical semiconductor device 531 is mounted on the lead frame of the substrate for mounting an optical semiconductor device of FIG. 4(*b*); and the optical semiconductor device 531 and the other lead frame which the optical semiconductor device 531 is not mounted are bonded by wire 532; and the concave portion is sealed with a transparent resin (sealing resin) 533. The inside of the sealing resin may contain a fluorescent body 534 for converting light emission such as blue into white.

Figure 5:
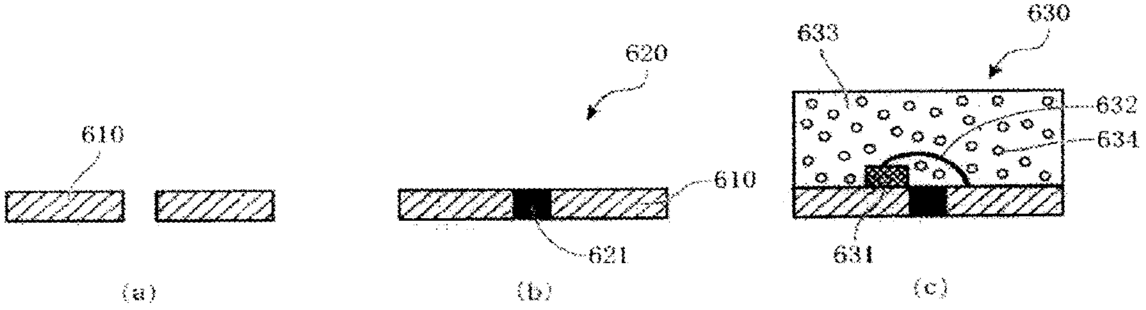
FIG. 5 is a schematic cross-sectional view showing another embodiment of a substrate for mounting an optical semiconductor device using the thermosetting composition of the invention and the optical semiconductor device.

Further, FIG. 5 is a schematic cross-sectional view showing another embodiment of a substrate for mounting an optical semiconductor device and the optical semiconductor device.

FIG. 5(*a*) shows a lead frame 610.

FIG. 5(*b*) shows a substrate for mounting an optical semiconductor device 620 in which a cured product is molded as a reflector 621 between the lead frame 610 of FIG. 5(*a*). A substrate for mounting an optical semiconductor device 620 contains a lead frame 610, and a reflector 621 described above between the lead frame 610.

FIG. 5(*c*) shows an optical semiconductor emitting device 630 having a substrate for mounting an optical semiconductor device of FIG. 5(*b*). An optical semiconductor device 631 is mounted on a lead frame 610, and after being electrically connected by a bonding wire 632, a sealing resin part composed of a transparent sealing resin 633 is cured and molded in a lump by a method such as transfer molding or compression molding to seal the optical semiconductor device 631, and then the optical semiconductor device is divided into individual pieces by dicing. The inside of the sealing resin may contain a fluorescent body 634 for converting light emission such as blue into white.

The dimension and shape of each part of the substrate for mounting an optical semiconductor device are not particularly limited, and can be appropriately set. Further, the sealing resin (sealing material) is made of, for example, an epoxy resin, a silicone resin, an acrylate resin, or the like.

EXAMPLES

Hereinafter, examples of the invention will be described in further detail with reference to Examples of the invention, but the invention is not limited to these Examples.

Examples 1 to 20 and Comparative Examples 1 to 4

(Preparation of the Thermosetting Composition)

Components (A-1), (A-2), and (B) to (H), and additives were blended in the blending amounts shown in Tables 1 to 3 to prepare a thermosetting composition. In Tables 1 to 3, the amounts of components (A-1), (A-2), and (B) to (G) indicate the amounts of each of components (A-1), (A-2), and (B) to (G) based on 100% by mass of the total amount of components (A-1), (A-2), and (B) to (G).

In addition, in Tables 1 to 3, the amounts of a component (H) and an additive indicate the amounts of each of a component (H) and an additive based on 100 parts by mass of the total amount of components (A-1), (A-2), and (B) to (G).

Specifically, in the preparation of the thermosetting composition, first, components (A-1), (A-2), and (D) to (F) and additives were weighed, respectively, and these were mixed and stirred. Next, components (H), (G), (C), and (B) were added in this order by weighing, and finally stirred to form a thermosetting composition.

As a stirring device, a stirring device capable of stirring by rotation and revolution was used. The rotation speed was 1000 rpm and 2000 rpm. The rotation time was 1 minute.

The following were used as a component (A-1).

Adamantyl methacrylate (MADMA, manufactured by OSAKA ORGANIC CHEMICAL INDUSTRY LTD, viscosity at 25° C.: 5 mPa·s)

Cyclohexyl methacrylate (light ester CH, manufactured by KYOEISHA CHEMICAL Co., LTD., viscosity at 25° C.: 5 mPa·s)

1-isobornyl methacrylate (IB-X, manufactured by KYOEISHA CHEMICAL Co., LTD., viscosity at 25° C.: 5 mPa·s)

1-isobornyl acrylate (SR506, manufactured by Arkema S. A., viscosity at 25° C.: 5 mPa·s)

For the component (A-1), the viscosity was measured using a melt viscoelastic device Physica MCR301 (manufactured by Anton Paar GmbH) under the following conditions.

Measuring method: Coaxial cylinder-type rotational viscosity measuring method Plate diameter: 25 mmφ, temperature: 25° C., shear rate: 10 $s^{-1}$ The following was used as a component (A-2).

BPE-80N: a compound represented by the following formula (Shin-Nakamura Chemical Co., Ltd., the average value of e+f is 2.3)

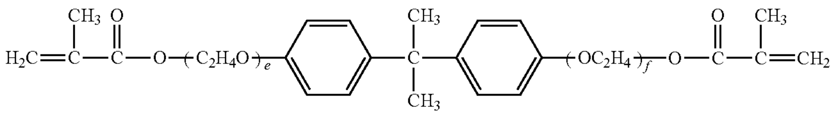

e + f = 2.3

SR-349: a compound represented by the following formula (manufactured by Arkema S. A.)

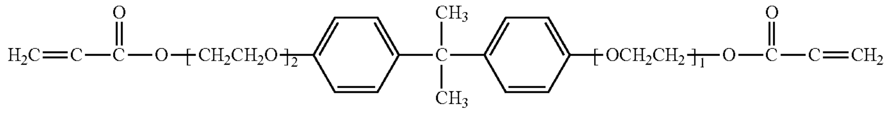

Epoxy ester 3000MK: a compound represented by the following formula (manufactured by KYOEISHA CHEMICAL Co., LTD.)

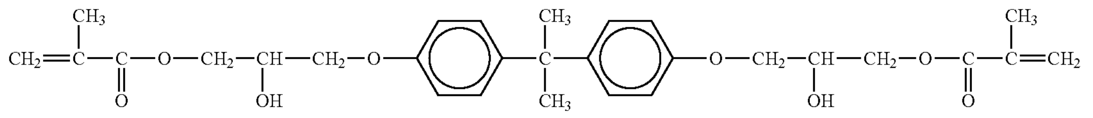

Epoxy ester 3002MK: a compound represented by the following formula (manufactured by KYOEISHA CHEMICAL Co., LTD.)

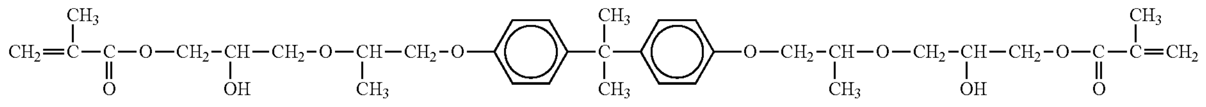

Epoxy acrylate oligomer CN120 (manufactured by Arkema S. A.)

With respect to the average value of e+f of BPE-80N, the intensity of $^1H$ of the $CH_2$=group at the terminal and the intensity of $^1H$ of the sum of $(C_2H_4)_e$ group and $(C_2H_4)_f$ were measured by $^1H$-NMR under the following conditions. The average value of e+f was calculated by dividing the value of (the intensity of $^1H$ of the sum of $(C_2H_4)_e$ group and $(C_2H_4)_f$ group)/4 by the value of (the intensity of $^1H$ of the $CH_2$=group at the terminal)/4.

Measuring instrument (manufactured by JEOL RESONANCE Inc.)

Magnetic field strength: 500 MHz

Reference substance: TMS (tetramethylsilane)

Solvent: deuterated chloroform

The following was used as a component (B). Hereinafter, the methacrylic silane surface treatment was applied using KBM-503 (3-methacryloxypropyltrimethoxysilane, manufactured by Shin-Etsu Chemical Co., Ltd.) while stirring so as to be uniformly coated.

CRS1085-SF630: spherical silica having a mean particle size (D50) of 15 μm (methacrylic silane surface treatment) (manufactured by TATSUMORI LTD.)

CRS1035-LER4: spherical silica having a mean particle size (D50) of 4 μm (methacrylic silane surface treatment) (manufactured by TATSUMORI LTD.)

S430-5PHM: spherical silica having a mean particle size (D50) of 5 μm (methacrylic silane surface treatment) (manufactured by Nippon Steel & Sumikin Materials Co., Ltd. Micron Co.)

The mean particle size (D50) of the component (B) and the mean particle size of the component (G) described later were measured using a laser diffraction particle size distribution measuring equipment SALD-300V (manufactured by SHIMADZU CORPORATION).

Each of the component (B) and the component (G) was dispersed in a toluene solvent, and the amounts are increased from a small amount so that the scattering intensity became a measurable amount, and was appropriately adjusted to a concentration capable of particle size measurement, and the addition weight of the particles was determined.

The following was used as a component (C).

PFC310: titanium oxide, primary mean particle size: 0.2 μm (Ishihara Sangyo Kaisha, Ltd.)

The primary mean particle size of the component (C) was obtained by dispersing the component (C) in ethylene glycol, preparing frozen sections, depositing gold, and the maximal length of 150 primary particles per one field of view in five 0.25 μm×0.25 μm field of view was measured using scanning electron microscope, and arithmetically averaged.

The following were used as a component (D).

G: Glycidyl methacrylate (manufactured by Kyoeisha Chemical Co., Ltd.)

P-1M: 2-metachloroxyethyl acid phosphate (manufactured by Kyoeisha Chemical Co., Ltd.)

SA: 2-metachloryloxyethylsuccinic acid (manufactured by Kyoeisha Chemical Co., Ltd.)

The following was used as a component (E).

Lauryl methacrylate (SR313, manufactured by Arkema S. A.)

Stearyl methacrylate (S, manufactured by Kyoeisha Chemical Co., Ltd.)

n-butyl methacrylate (NB, manufactured by Kyoeisha Chemical Co., Ltd.)

Isodecyl methacrylate (ID, manufactured by Kyoeisha Chemical Co., Ltd.)

MMA: methyl methacrylate (manufactured by Hiroshima Wako Co., Ltd.)

CN9783 (urethane acrylate, manufactured by Arkema S. A.)

UX-4101 (urethane acrylate, manufactured by Nippon Kayaku Co., Ltd.)

UN-9000PEPZ (urethane acrylate, manufactured by Negami Chemical Industrial Co., Ltd.)

The following were used as a component (F).

1,9ND-A: 1,9-nonanediol diacrylate (manufactured by Kyoeisha Chemical Co., Ltd.)

A-DON-N: 1,10-decanediol diacrylate (manufactured by Shin-Nakamura Chemical Co., Ltd.)

SR9035: ethoxylated (15) trimethylolpropane triacrylate (a compound represented by the formula (x+y+z=15), manufactured by Arkema S. A.)

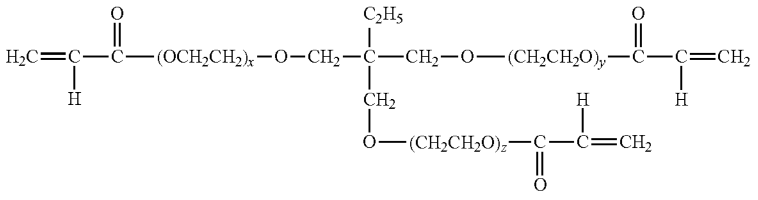

With respect to x+y+z of SR9035, the intensity of $^1H$ of the $CH_2$=group at the terminal, and the intensity of $^1H$ of the sum of —$C(CH_2—)_3$ group, $(C_2H_4)_x$ group, $(C_2H_4)_y$ group, and $(C_2H_4)_z$ group were measured by $^1H$-NMR under the same conditions as measuring the average value of e+f of BPE-80N.

The x+y+z was calculated by dividing the value of (the intensity of $^1H$ of the sum of —$C(CH_2—)_3$ group, $(C_2H_4)_x$ group, $(C_2H_4)_y$ group, and $(C_2H_4)_z$ group)/4 by the value of (the intensity of $^1H$ of $CH_2$=group at the terminal)/6, and by subtracting 1.5 from the divided value.

The following was used as a component (G).

FH105: talc, a mean particle size of 4 μm (manufactured by FUJI TALC INDUSTRIAL CO., LTD.)

JM-209: talc, a mean particle size of 5 μm (manufactured by ASADA MILLING CO., LTD.)

The following was used as a component (H).

R7200: nanosilica, primary mean particle size of 0.012 μm (manufactured by NIPPON AEROSIL CO., LTD.)

The primary mean particle size of the component (H) was obtained by dispersing the component (H) in ethylene glycol, preparing frozen sections, and the maximal length of 150 primary particles in five 0.25 μm×0.25 μm field of view was measured using transmission electron microscope, and arithmetically averaged.

(Viscosity Measurement of the Thermosetting Composition)

The obtained thermosetting composition was measured for viscosity at shear rates of 10 $s^{-1}$ and 100 $s^{-1}$ on the basis of JIS K7117-2 using a viscoelasticity measuring device Physica MCR301 (manufactured by Anton Paar GmbH) under the following conditions. The results are shown in Tables 1 to 3.

Measuring method: Coaxial cylinder-type rotational viscosity measuring method

Temperature: 25° C.

Shear rate range: 0.1 to 200 $s^{-1}$ (Evaluation of Storing Property)

1000 g of the obtained thermosetting composition was weighed into a 300 ml disposable cup made of polypropylene (V-300, Φ91×Φ67×96 mm, manufactured by AS ONE CORPORATION.), or a 500 ml disposable cup (V-500, Φ103×Φ78×119 mm, manufactured by AS ONE CORPORATION.). After weighing, the disposable cup was placed in a sealed container so that the thermosetting composition did not volatilize and left for 72 hours. After lefting, the liquid amount of the supernatant liquid which is solid-liquid separated and floats (hereinafter, referred to as "liquid floating amount") was weighed.

It is preferable that the liquid floating amount be small, and a case in which the liquid floating amount is less than 0.1 ml is defined as "◎ (excellent)", a case in which the liquid floating amount is 0.1 to 1 ml is defined as "○ (good)", and a case in which the liquid floating amount is more than 1 ml is defined as "×(bad)."

The results are shown in Tables 1 to 3.

(Manufacturing of Molded Article 1)

The thermosetting composition described above was subjected to LTM molding or LIM molding under the following conditions to obtain a molded article (cured product) 1.

A mold having a width of 10 mm, a length of 50 mm, and a thickness of 1 mm with a vent part having a width of 5 mm, a length of 10 mm, and a thickness of 0.03 mm at the flow end part was used as the mold.

The LTM molding was performed under the following conditions. In Tables 1 to 3, the method of manufacturing the molded article 1 is indicated as LTM for the molded article 1 subjected to the LTM molding.

Molding Machine: Liquid transfer molding machine G-Line (manufactured by APIC YAMADA CORPORATION)

Weighing with the plunger in the molding machine: 1.5 g

Flow path temperature of the low-temperature part: 25° C.

Flow path and blocking method: manual blocking using a syringe

Flow path temperature of the high-temperature part and cavity temperature: 135° C.

Filling time: 5 seconds

Filling pressure: 10 MPa or less (Filling time priority)

Holding time: 15 seconds

Holding pressure: 15 MPa

Curing time: 90 seconds

The LIM molding was performed under the following conditions. In Tables 1 to 3, the method of manufacturing the molded article 1 is indicated as LIM for the molded article 1 subjected to the LIM molding.

Molding machine: Liquid thermosetting resin injection molding machine LA-40S (manufactured by Sodick Co., Ltd.)

Weighing with the plunger in the molding machine: 1.1 g

Flow path temperature of the low-temperature part: 15° C.

Flow path and thermal isolation method: blocking using a shut-off nozzle

Flow path temperature and cavity temperature of the high-temperature portion: 135° C.

Filling time: 5 seconds

Filling pressure: 10 MPa or less (Filling time priority)

Holding time: 15 seconds

Holding pressure: 15 MPa

Curing time: 90 seconds (Evaluation of Filling Property)

In the filling of the thermosetting composition for manufacturing the molded article 1 described above, the filling property was visually confirmed. The case where no void was generated and no unfilled was occurred was defined as "○ (good)". The case where voids were generated or unfilled were occurred was defined as "Δ (poor)". The case where voids were generated and unfilled was occurred was defined as "× (bad)".

(Evaluation of Presence or Absence of Burrs)

The obtained molded article 1 was visually evaluated for the presence or absence of burrs. The case where there was no burr exceeding the end of the vent part and there was no burr from the part other than the vent part was defined as "○ (good)". The case where there were burrs exceeding the end of the vent part or there were burrs from the part other than the vent part was defined as "Δ (poor)". The case where there were burrs exceeding the end of the vent part and there were burrs from the part other than the vent part was defined as "× (bad)".

(Evaluation of Continuous Moldability 1)

The manufacturing of the molded article 1 described above was repeated 300 times continuously. After repeating 300 times, clogging of the flow path of the low-temperature part due to the thermosetting composition was evaluated.

The 10th molded article 1 and the 300th molded article 1, which were continuously repeated 300 times, were weighed, respectively. The difference between the weighed value of the 10th molded article 1 and the weighed value of the 300th molded article 1 was divided by the weighed value of the 10th molded article 1 to obtain the weighing error due to clogging as a percentage.

The case where the flow path was not clogged, and the absolute value of the weighing error was 15% or less was defined as "○ (good)". The case where the flow path is clogged, or the absolute value of the weighing error is more than 15% was defined as "× (bad)".

(Evaluation of Continuous Moldability 2)

The manufacturing of the molded article 1 described above was repeated 100 times continuously. Thereafter, the molding machine was left to stand for 24 hours, and the molding was repeated 100 times continuously. After repeating a total of 200 times, clogging of the flow path of the low-temperature part by the thermosetting composition was evaluated. Further, the difference between the weighed value of the 10th molded article 1 out of the first 100 times and the weighed value of the 100th molded article 1 out of the second 100 times was divided by the weighed value of the above-described 10th molded article 1 to obtain a weighing error due to clogging as a percentage.

The case where the flow path was not clogged, and the absolute value of the weighing error was 15% or less was defined as "○ (good)". The case where the flow path is clogged, or the absolute value of the weighing error is more than 15% was defined as "× (bad)".

(Manufacturing of Molded Article 2)

A molded article was produced in the same manner as in the manufacturing of the molded article 1 except that the following mold was used. The obtained molded article was referred to as a molded article 2.

As a mold, a mold having a length of 30 mm, a width of 30 mm, and a thickness of 2 mm was used.

Measurement of Light Reflectance)

The light reflectance of the obtained molded article 2 was measured using an integrating sphere spectrophotometer CE-7000 A (manufactured by GretagMacbeth GmbH) in the wavelength range of 400 to 700 nm under the conditions that the reflectance measurement mode, a 10 degree field of view, diffuse illumination/8 degree directional light reception, a colorimetric area of 5 mm×10 mm, and specular reflection and ultraviolet light were contained, and the light reflectance of the molded article 2 at 450 nm was determined.

(Evaluation of Light Resistance (LED Energization Test))

The molded article 2 described above was fixed on an LED package on which a blue LED (manufactured by GeneLite Inc.; trade name: OBL-CH2424) was mounted, and was energized at an environmental temperature of 60° C. and a current value of 150 mA for one week to emit. After one week, the surface of the molded article 2 irradiated with the blue LED light was visually observed and evaluated according to the following criteria.

"○ (good)": No discoloration compared to before irradiation "× (bad)": Brown discoloration compared to before irradiation (Evaluation of Heat Resistance)

After the measurement of the above-described light reflectance (which is referred to as the initial reflectance), the molded article 2 was heated at 180° C. for 72 hours.

After heating, the reflectance was measured in the same manner as in the measurement of the above-described light reflectance, and the light reflectance of the molded article 2 at 450 nm was determined (which is referred to as the reflectance after heating).

The difference between the initial reflectance and the reflectance after heating was divided by the initial reflectance, and the case where the absolute value of the difference in percentage was less than 5% was defined as "○ (good)", the case where the absolute value was 5% or more and less than 10% was defined as "Δ (poor)", and the case where the absolute value was 10% or more was defined as "× (bad)".

TABLE 1

| | | Example 1 | Example 2 | Example 3 | Example 4 | Example 5 | Example 6 | Example 7 | Example 8 | Example 9 | Example 10 |
|---|---|---|---|---|---|---|---|---|---|---|---|
| Component (A-1) | Adamantyl methacrylate | 4 | 3 | — | 4 | 3 | — | 2.5 | 3 | 3 | 2 |
| (% by mass) | Cyclohexyl methacrylate | — | — | — | — | — | — | — | — | — | — |
| | 1-isobornyl methacrylate | — | — | 4 | — | — | 4 | — | — | — | — |
| | 1-isobornyl acrylate | — | — | — | — | — | — | — | — | — | — |
| Component (A-2) | BPE-80N | — | — | — | — | — | — | — | — | — | — |
| (% by mass) | SR-349 | 5 | 2.5 | — | 5 | 2.5 | — | 4 | 4 | — | — |
| | Epoxy ester 3000MK | — | — | 3 | — | — | 3 | — | — | 4 | 5 |
| | Epoxy ester 3002MK | — | — | — | — | — | — | — | — | — | — |
| | Epoxy acrylate oligomer CN120 | — | — | — | — | — | — | — | — | — | — |
| Component (B) | CRS1085-SF630 | — | — | — | — | — | — | — | — | — | — |
| (% by mass) | CRS1035-LER4 | 65 | 70 | 70 | 65 | 70 | 70 | 67 | 67 | 67 | — |
| | S430-5PHM | — | — | — | — | — | — | — | — | — | 69 |
| Component (C) (% by mass) | PFC310 | 10 | 10 | 10 | 10 | 10 | 10 | 13 | 13 | 13 | 10 |
| Component (D) | G | 4 | 4 | 4 | 4 | 4 | 4 | 4.5 | — | — | 4 |
| (% by mass) | P-1M | — | — | — | — | — | — | — | — | 4 | — |
| | SA | — | — | — | — | — | — | — | 4 | — | — |

TABLE 1-continued

| | | Example 1 | Example 2 | Example 3 | Example 4 | Example 5 | Example 6 | Example 7 | Example 8 | Example 9 | Example 10 |
|---|---|---|---|---|---|---|---|---|---|---|---|
| Component (E) | Lauryl methacrylate | 4 | 3.5 | 4 | 4 | 3.5 | 4 | 1.5 | 1.5 | — | — |
| (% by mass) | Stearyl methacrylate | — | — | — | — | — | — | — | — | 1.5 | — |
| | n-butyl methacrylate | — | — | — | — | — | — | — | — | — | 3 |
| | Isodecyl methacrylate | — | — | — | — | — | — | — | — | — | — |
| | MMA | — | — | — | — | — | — | — | — | — | — |
| | CN9783 | — | — | — | — | — | — | — | — | — | — |
| | UX-4101 | — | — | — | — | — | — | — | — | — | — |
| | UN-9000PEPZ | — | — | — | — | — | — | — | — | — | — |
| Component (F) | 1.9ND-A | 5 | 4 | | 5 | 4 | — | 4.5 | 4.5 | — | — |
| (% by mass) | A-DOD-N | — | — | 5 | — | — | 5 | — | — | 4.5 | 4 |
| | SR9035 | — | — | — | — | — | — | — | — | — | — |
| Component (G) | FH105 | 3 | 3 | — | 3 | 3 | — | 3 | 3 | — | 3 |
| (% by mass) | JM-209 | — | — | — | — | — | — | — | — | 3 | — |
| Component (H) (parts by mass) | R7200 | — | — | — | — | — | — | — | — | — | — |
| Viscosity of thermosetting composition (Pa · s) | 10 $s^{-1}$ | 30 | 35 | 30 | 30 | 35 | 30 | 45 | 45 | 45 | 50 |
| | 100 $s^{-1}$ | 15 | 10 | 10 | 15 | 10 | 10 | 15 | 15 | 15 | 15 |
| storing property | | ◎ | ◎ | ◎ | ◎ | ◎ | ◎ | ◎ | ◎ | ◎ | ◎ |
| method for manufacturing a molded article | | LTM | LTM | LTM | LIM | LIM | LIM | LIM | LIM | LIM | LIM |
| filling property | | ○ | ○ | ○ | ○ | ○ | ○ | ○ | ○ | ○ | ○ |
| presence or absence of burrs | | ○ | ○ | ○ | ○ | ○ | ○ | ○ | ○ | ○ | ○ |
| continuous moldability 1 | | ○ | ○ | ○ | ○ | ○ | ○ | ○ | ○ | ○ | ○ |
| continuous moldability 2 | | ○ | ○ | ○ | ○ | ○ | ○ | ○ | ○ | ○ | ○ |
| light reflectance at 450 nm (%) | | 94 | 94 | 94 | 94 | 94 | 94 | 95 | 95 | 95 | 94 |
| light resistance | | ○ | ○ | ○ | ○ | ○ | ○ | ○ | ○ | ○ | ○ |
| heat resistance | | ○ | ○ | ○ | ○ | ○ | ○ | ○ | ○ | ○ | ○ |

TABLE 2

| | | Example 11 | Example 12 | Example 13 | Example 14 | Example 15 | Example 16 | Example 17 | Example 18 | Example 19 | Example 20 |
|---|---|---|---|---|---|---|---|---|---|---|---|
| Component (A-1) | Adamantyl methacrylate | — | — | — | — | 2 | — | — | 3 | — | — |
| (% by mass) | Cyclohexyl methacrylate | 2 | — | — | — | — | 2 | — | — | 3 | — |
| | 1-isobornyl methacrylate | — | 2.5 | — | 3 | — | — | 2 | — | — | — |
| | 1-isobornyl acrylate | — | — | 3 | — | — | — | — | — | — | 3 |
| Component (A-2) | BPE-80N | — | — | — | — | — | — | — | — | — | 2 |
| (% by mass) | SR-349 | 5 | — | — | — | — | — | — | — | 2 | — |
| | Epoxy ester 3000MK | — | 4 | 5 | 1.5 | 2 | 2 | 2 | — | — | 2 |
| | Epoxy ester 3002MK | — | — | — | — | — | — | — | — | — | — |
| | Epoxy acrylate oligomer CN120 | — | — | — | 1.5 | — | — | — | 2 | — | — |
| Component (B) | CRS1085-SF630 | 70 | — | — | — | — | — | — | — | — | — |
| (% by mass) | CRS1035-LER4 | — | 72 | — | — | — | — | — | 70 | — | — |
| | S430-5PHM | — | — | 68 | 70 | 70 | 70 | 70 | — | 70 | 70 |
| Component (C) (% by mass) | PFC310 | 10 | 10 | 10 | 10 | 10 | 10 | 10 | 10 | 10 | 10 |
| Component (D) | G | 3 | 2.5 | 4 | 3 | 3 | 3 | 3 | — | — | 4 |
| (% by mass) | P-1M | — | — | — | — | — | — | — | 4 | — | — |
| | SA | — | — | — | — | — | — | — | — | 4 | — |
| Component (E) | Lauryl methacrylate | — | — | — | — | — | — | — | 4.5 | — | 3 |
| (% by mass) | Stearyl methacrylate | — | 2 | — | 4 | 3.5 | 3.5 | 3.5 | — | — | — |
| | n-butyl methacrylate | — | — | — | — | — | — | — | — | 4 | — |
| | Isodecyl methacrylate | 3 | — | 3 | — | — | — | — | — | — | — |
| | MMA | — | — | — | — | — | — | — | — | — | — |
| | CN9783 | — | — | — | — | 2.5 | — | — | — | — | — |
| | UX-4101 | — | — | — | — | — | 2.5 | — | — | — | — |
| | UN-9000PEPZ | — | — | — | — | — | — | 2.5 | — | — | — |
| Component (F) | 1.9ND-A | — | — | — | — | — | — | — | 4.5 | 4 | — |
| (% by mass) | A-DOD-N | 4 | 4 | 4 | 4 | 4 | 4 | 4 | — | — | 4 |
| | SR9035 | — | — | — | — | — | — | — | — | — | — |
| Component (G) | FH105 | 3 | 3 | 3 | 3 | 3 | 3 | 3 | 2 | 3 | — |
| (% by mass) | JM-209 | — | — | — | — | — | — | — | — | — | 2 |
| Component (H) (parts by mass) | R7200 | — | — | — | — | — | — | — | — | — | — |
| Viscosity of thermosetting composition (Pa · s) | 10 $s^{-1}$ | 55 | 65 | 35 | 80 | 85 | 85 | 80 | 65 | 40 | 40 |
| | 100 $s^{-1}$ | 15 | 20 | 10 | 25 | 20 | 20 | 20 | 20 | 15 | 15 |
| storing property | | ◎ | ◎ | ◎ | ◎ | ◎ | ◎ | ◎ | ◎ | ◎ | ◎ |
| method for manufacturing a molded article | | LIM | LIM | LIM | LIM | LIM | LIM | LIM | LIM | LIM | LIM |
| filling property | | ○ | ○ | ○ | ○ | ○ | ○ | ○ | ○ | ○ | ○ |
| presence or absence of burrs | | ○ | ○ | ○ | ○ | ○ | ○ | ○ | ○ | ○ | ○ |
| continuous moldability 1 | | ○ | ○ | ○ | ○ | ○ | ○ | ○ | ○ | ○ | ○ |

TABLE 2-continued

| | Example 11 | Example 12 | Example 13 | Example 14 | Example 15 | Example 16 | Example 17 | Example 18 | Example 19 | Example 20 |
|---|---|---|---|---|---|---|---|---|---|---|
| continuous moldability 2 | ○ | ○ | ○ | ○ | ○ | ○ | ○ | ○ | ○ | ○ |
| light reflectance at 450 nm (%) | 94 | 94 | 94 | 94 | 94 | 94 | 94 | 94 | 94 | 93 |
| light resistance | ○ | ○ | ○ | ○ | ○ | ○ | ○ | ○ | ○ | ○ |
| heat resistance | ○ | ○ | ○ | ○ | ○ | ○ | ○ | ○ | ○ | ○ |

TABLE 3

| | | Example 21 | Example 22 | Example 23 | Comp. Ex. 1 | Comp. Ex. 2 | Comp. Ex. 3 | Comp. Ex. 4 |
|---|---|---|---|---|---|---|---|---|
| Component (A-1) | Adamantyl methacrylate | — | 3 | 3 | 6 | 20 | — | — |
| (% by mass) | Cyclohexyl methacrylate | — | — | — | — | — | — | — |
| | 1-isobornyl methacrylate | — | — | — | — | — | — | — |
| | 1-isobornyl acrylate | 3 | — | — | — | — | — | — |
| Component (A-2) | BPE-80N | 2 | — | — | — | — | — | — |
| (% by mass) | SR-349 | — | 5 | — | — | — | — | — |
| | Epoxy ester 3000MK | 2 | — | 3 | — | — | — | — |
| | Epoxy ester 3002MK | — | — | — | — | — | — | — |
| | Epoxy acrylate oligomer CN120 | — | — | — | — | — | — | — |
| Component (B) | CRS1085-SF630 | — | — | — | 80 | — | — | — |
| (% by mass) | CRS1035-LER4 | — | — | — | — | — | 70 | 75 |
| | S430-5PHM | 70 | 70 | 70 | — | 50 | — | — |
| Component (C) (% by mass) | PFC310 | 10 | 7 | 7 | 10 | 10 | 10 | 10 |
| Component (D) | G | 4 | 4 | 4 | — | — | — | — |
| (% by mass) | P-1M | — | — | — | — | — | — | — |
| | SA | — | — | — | — | — | — | — |
| Component (E) | Lauryl methacrylate | — | 4 | — | 2 | 10 | — | — |
| (% by mass) | Stearyl methacrylate | — | — | 6 | — | — | — | — |
| | n-butyl methacrylate | 7 | — | — | — | — | — | — |
| | Isodecyl methacrylate | — | — | — | — | — | — | — |
| | MMA | — | — | — | — | — | 20 | 15 |
| | CN9783 | — | — | — | — | — | — | — |
| | UX-4101 | — | — | — | — | — | — | — |
| | UN-9000PEPZ | — | — | — | — | — | — | — |
| Component (F) | 1.9ND-A | — | — | 5 | 2 | — | — | — |
| (% by mass) | A-DOD-N | — | 4 | — | — | 10 | — | — |
| | SR9035 | 2 | — | — | — | — | — | — |
| Component (G) | FH105 | — | 3 | 2 | — | — | — | — |
| (% by mass) | JM-209 | — | — | — | — | — | — | — |
| Component (H) (parts by mass) | R7200 | — | — | 0.2 | — | — | — | — |
| Viscosity of | 10 $s^{-1}$ | 30 | 40 | 30 | 160 | 1 | 15 | 20 |
| thermosetting composition (Pa · s) | 100 $s^{-1}$ | 5 | 15 | 10 | 60 | 0.5 | 4 | 4 |
| storing property | | ◎ | ◎ | ◎ | ◎ | X | ◎ | ◎ |
| method for manufacturing a molded article | | LIM | LIM | LIM | LIM | LIM | LTM | LIM |
| filling property | | ○ | ○ | ○ | X | X | ○ | ○ |
| presence or absence of burrs | | ○ | ○ | ○ | ○ | X | ○ | ○ |
| continuous moldability 1 | | ○ | ○ | ○ | X | ○ | ○ | ○ |
| continuous moldability 2 | | ○ | ○ | ○ | X | X | ○ | ○ |
| light reflectance at 450 nm (%) | | 93 | 93 | 93 | 94 | 94 | 94 | 94 |
| light resistance | | ○ | ○ | ○ | ○ | ○ | ○ | ○ |
| heat resistance | | ○ | ○ | ○ | ○ | Δ | X | X |

While some embodiments and/or examples of the present invention have been described in detail above, those skilled in the art will readily make many changes to these illustrative embodiments and/or examples without materially departing from the novel teachings and advantages of the invention. Accordingly, all such modifications are intended to be included within the scope of this invention.

The documents described in the specification are incorporated herein by reference in its entirety.

The invention claimed is:

1. A thermosetting composition, comprising:

component (A-1) which is an acrylate compound or a methacrylate compound in which a substituted or unsubstituted alicyclic hydrocarbon group including 6 or more ring carbon atoms is ester-bonded;

component (A-2) which is at least one selected from the group consisting of

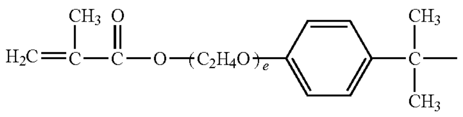

-continued

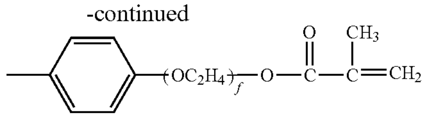

e + f = 2.3

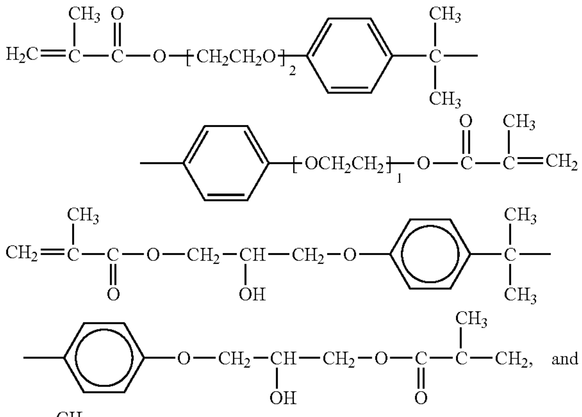

and

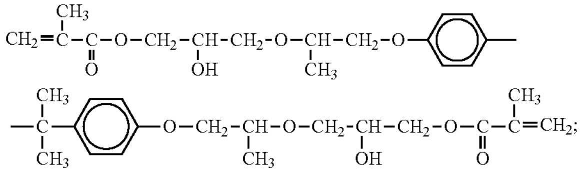

component (B) which is a spherical silica;

component (C) which is a white pigment; and component (F) which is at least one selected from the group consisting of 1,10-decanedioldi(meth)acrylate, 1,9-nonanedioldi(meth)acrylate, and a compound of the following formula

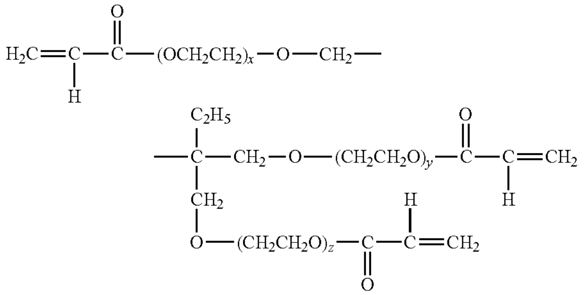

where x, y, and z are each positive integers and x+y+z=15, wherein the thermosetting composition has a viscosity of from 5 to 200 Pa·s at a shear rate of 10 s−1 at 25° C., and has a viscosity of from 1 to 50 Pa·s at a shear rate of 100 s−1 at 25° C., as measured by JIS K7117-2.

2. The thermosetting composition of claim 1, wherein an amount of the component (B) is from 10 to 90% by mass and an amount of the component (C) is from 1 to 50% by mass, based on 100% by mass of a total of the components (A-1), (A-2), (B), and (C).

3. The thermosetting composition of claim 1, wherein the substituted or unsubstituted alicyclic hydrocarbon group of the component (A-1) is at least one group selected from the group consisting of a substituted or unsubstituted adamantyl group, a substituted or unsubstituted norbornyl group, a substituted or unsubstituted isobornyl group, and a substituted or unsubstituted dicyclopentanyl group.

4. The thermosetting composition of claim 1, further comprising:

at least one component selected from the group consisting of components (D) and (E), wherein an amount of the component (B) is from 10 to 90% by mass and an amount of the component (C) is from 1 to 50% by mass, based on 100% by mass of a total of the components (A-1), (A-2), and (B) to (F), the component (D) is an acrylic acid, a methacrylic acid, a monofunctional acrylate compound having a polar group, or a methacrylate compound having a polar group; and the component (E) is a monofunctional acrylate compound or methacrylate compound other than the components (A-1) and (D).

5. The thermosetting composition of claim 4, wherein the component (E) does not contain an aliphatic urethane structure.

6. The thermosetting composition of claim 1, wherein the spherical silica is surface-treated with an acrylic silane or surface-treated with a methacrylic silane.

7. The thermosetting composition of claim 1, wherein the component (B) has a mean particle size of from 0.1 to 100 lim.

8. The thermosetting composition of claim 1, further comprising:

at least one component selected from the group consisting of (G) a plate-like filler and (H) a nanoparticle.

9. A method for manufacturing a molded article, comprising:

supplying the thermosetting composition of claim 1 into a plunger;

filling the thermosetting composition into a molding part of a mold by the plunger;

thermosetting the thermosetting composition in the molding part, thereby producing a thermosetting resin; and extruding the thermosetting resin.

10. The method of claim 9, wherein a temperature of the mold part constituting the molding part is from 100 to 180° C.

11. The method of claim 9, wherein a flow path controlled by a temperature of 50° C. or less is provided between the plunger and the molding part, and the filling is performed through the flow path.

12. The method of claim 11, wherein the flow path has a gate system for blocking the flow of the thermosetting composition and the transfer of heat.

13. The method of claim 12, wherein the filling is performed by opening a gate of the gate system;

in the thermosetting, pressure retention is performed; and after the pressure retention, the gate of the gate system is closed to complete thermosetting.

14. The method of claim 9, wherein the filling and the thermosetting are performed in from 0.2 to 3 minutes.

15. A cured product, which is manufactured with the thermosetting composition of claim 1.

16. The cured product of claim 15, which is a molded article.

17. The thermosetting composition of claim 1, wherein the component (A-1) is at least one selected from the group consisting of adamantly methacrylate, cyclohexyl methacrylate, 1-isobornyl methacrylate, and 1-isobornyl acrylate.

18. The thermosetting composition of claim 1, wherein a ratio of an amount of the component (A-1) to an amount of the component (A-2) is from 2:1 to 2:5.

19. The thermosetting composition of claim 1, wherein the thermosetting composition has a liquid separation after 72 hours of less than 0.1 mL.

* * * * *